US010568342B2

(12) United States Patent
Arao et al.

(10) Patent No.: US 10,568,342 B2
(45) Date of Patent: Feb. 25, 2020

(54) DEVICE FOR ADJUSTING TEMPERATURE OF FROZEN FOOD, AND PACKAGING CONTAINER

(71) Applicant: LOTTE CO., LTD., Tokyo (JP)

(72) Inventors: Hitoshi Arao, Saitama (JP); Takeyuki Fujimatsu, Saitama (JP); Naoya Akiyama, Saitama (JP)

(73) Assignee: LOTTE CO., LTD., Tokyo (JP)

( * ) Notice: Subject to any disclaimer, the term of this patent is extended or adjusted under 35 U.S.C. 154(b) by 0 days.

(21) Appl. No.: 16/300,102

(22) PCT Filed: May 17, 2017

(86) PCT No.: PCT/JP2017/018588
§ 371 (c)(1),
(2) Date: Nov. 9, 2018

(87) PCT Pub. No.: WO2017/200022
PCT Pub. Date: Nov. 23, 2017

(65) Prior Publication Data
US 2019/0142028 A1    May 16, 2019

(30) Foreign Application Priority Data
May 18, 2016 (JP) ................................ 2016-099609

(51) Int. Cl.
*A23G 9/28* (2006.01)
*B65D 77/38* (2006.01)
*B65D 85/78* (2006.01)
*A23G 9/22* (2006.01)

(52) U.S. Cl.
CPC ............... *A23G 9/28* (2013.01); *A23G 9/227* (2013.01); *B65D 77/38* (2013.01); *B65D 85/78* (2013.01)

(58) Field of Classification Search
CPC . A23G 9/28; A23G 9/227; A23G 9/24; B65D 85/78; B65D 85/38; B65D 77/38
USPC ... 222/146.6, 146.1, 98, 101, 102, 214, 325, 222/326
See application file for complete search history.

(56) References Cited

U.S. PATENT DOCUMENTS

| | | | | |
|---|---|---|---|---|
| 6,003,733 A | * | 12/1999 | Wheeler | B67D 1/0004 222/146.5 |
| 6,938,801 B1 | * | 9/2005 | Reddy | B67D 1/0007 222/132 |
| 7,665,630 B2 | * | 2/2010 | McGill | A23G 9/28 222/1 |

(Continued)

FOREIGN PATENT DOCUMENTS

| | | |
|---|---|---|
| JP | H08-011934 A | 1/1996 |
| JP | H11-075701 A | 3/1999 |

(Continued)

*Primary Examiner* — Lien M Ngo
(74) *Attorney, Agent, or Firm* — Rabin & Berdo, P.C.

(57) ABSTRACT

A frozen food temperature adjusting apparatus includes a setting mechanism in which a temperature adjustment object is placed; a heat exchanging/pressing mechanism which exchanges heat with the temperature adjustment object placed in the setting mechanism while pressing the temperature adjustment object; and a serving mechanism which receives the temperature-adjusted temperature adjustment object and serves the temperature-adjusted temperature adjustment object in a predetermined container.

9 Claims, 25 Drawing Sheets

(56) References Cited

U.S. PATENT DOCUMENTS

| | | | |
|---|---|---|---|
| 8,678,236 B2* | 3/2014 | Burke | B67D 7/0216 |
| | | | 222/101 |
| 2004/0129722 A1 | 7/2004 | Pahl | |
| 2007/0068966 A1* | 3/2007 | Orzech | B67D 1/108 |
| | | | 222/136 |
| 2008/0121662 A1* | 5/2008 | Gehl | B67D 1/108 |
| | | | 222/214 |
| 2009/0117242 A1* | 5/2009 | Kateman | A23G 9/08 |
| | | | 426/474 |
| 2012/0111895 A1* | 5/2012 | Fitzpatrick | A47K 5/1209 |
| | | | 222/214 |

FOREIGN PATENT DOCUMENTS

| | | | |
|---|---|---|---|
| JP | 2000-157180 A | | 6/2000 |
| JP | 2003-135005 A | | 5/2003 |
| JP | 3433344 B2 | | 8/2003 |
| JP | 2004-129628 A | | 4/2004 |
| JP | 2005-052060 A | | 3/2005 |
| JP | 2005-130840 A | | 5/2005 |
| JP | 2005151951 A | | 6/2005 |
| JP | 2006-219190 A | | 8/2006 |
| JP | 2006-304651 A | * | 11/2006 |
| JP | 2007-236367 A | | 9/2007 |
| JP | 2008-022725 A | | 2/2008 |
| JP | 2009-169457 A | | 7/2009 |
| WO | 02102170 A1 | | 12/2002 |
| WO | WO-2007/108136 A1 | | 9/2007 |

* cited by examiner

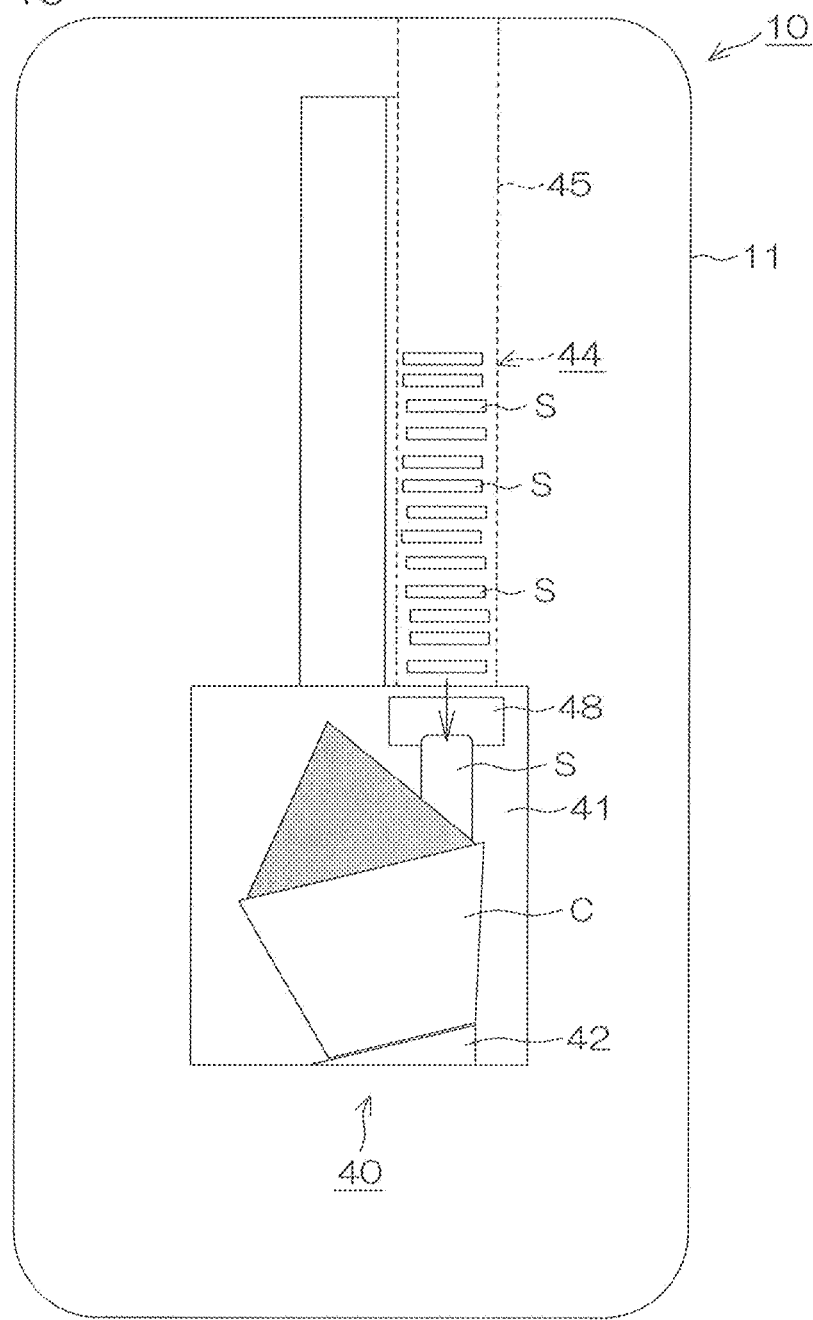
FIG. 16
FIG. 17 (A)
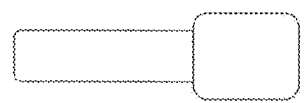
(B)
(C)
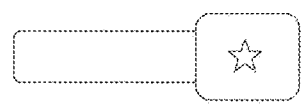
(D)

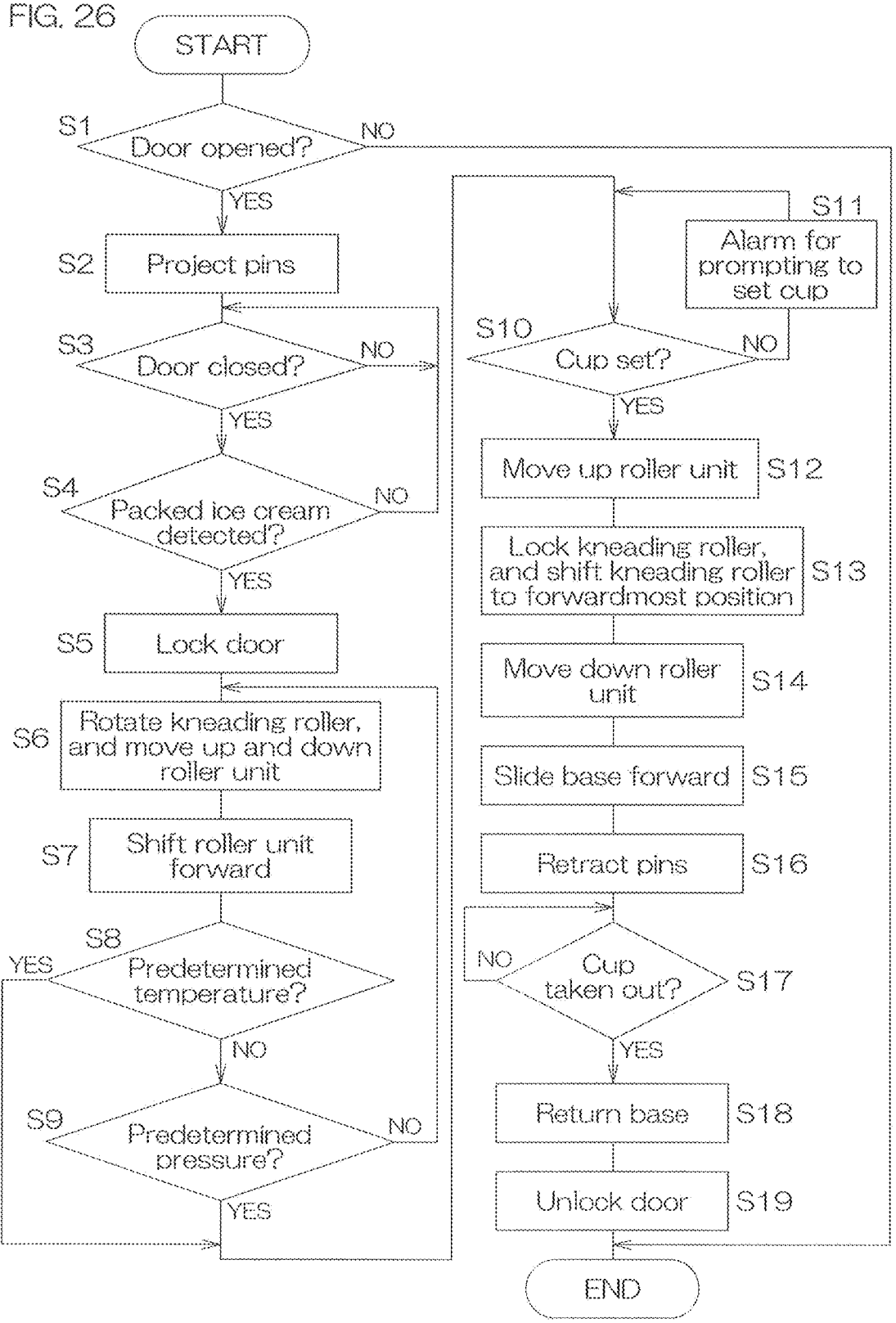

DEVICE FOR ADJUSTING TEMPERATURE OF FROZEN FOOD, AND PACKAGING CONTAINER

TECHNICAL FIELD

The present invention relates to a frozen food temperature adjusting apparatus which adjusts the temperature of frozen food, particularly, frozen confectionary or frozen drink, to an appropriate temperature level and serves the temperature-adjusted frozen food. More specifically, the present invention relates to a gelato server which adjusts the temperature of ice cream and serves the ice cream in the form of gelato. The present invention further relates to a packaging container for containing the frozen food.

BACKGROUND ART

In the market for ice cream (ice confectionary) as frozen food, there are two selling methods, i.e., "product-based selling method" and "menu-based selling method." That is, packaged ice cream products are stored in a frozen state (at about −20° C.) and displayed for store sales or mail order sales in the product-based selling method. In the menu-based selling method, soft ice cream is made by refrigerating a liquid material at about −5° C. and served for sales at a store, or a sales person serves ice cream from a bulk ice cream product with the use of an ice cream disher or from a one-shot type ice cream product at a store, or mixes ice cream with a liquid material to process the ice cream into frozen drink for sales.

In the menu-based selling method in which ice cream having a smooth and soft eating texture can be served, a production license and a higher initial investment are required. Further, operations to be performed by store staff include material feeding, temperature adjustment, production machine operation, customer service, machine cleaning and sanitary management.

A one-shot type ice cream system currently employed requires no storefront production license, and utilizes special one-shot ice cream cartridges, a special apparatus and a special freezer, whereby the operations to be performed by the store staff are simplified, which mainly include server apparatus operation, customer service and simplified apparatus maintenance.

Since the ice cream cartridges are supplied in a frozen state (at about −20° C.), it is necessary to install a special freezer stocker in the store and adjust the temperatures of the ice cream cartridges (to about −12° C.) over six hours to soften the ice cream. Further, the once temperature-adjusted ice cream cartridges should be used within one week. After a lapse of the one week, ice crystal grains are likely to grow in the ice cream.

PTL 1 discloses an ice confectionary defrosting/dispensing method in which a dispensing container filled with ice confectionary is heated to a higher temperature, and the dispensing container is rubbed by applying a pressure to the dispensing container.

PTL 2 discloses a temperature adjusting method in which frozen soft ice cream is partially defrosted by applying outside warm air to a heat absorption radiation plate and then a compressing operation and a kneading operation are performed to render the frozen soft ice cream into a sherbet-like state.

PTL 3 and PTL 4 disclose temperature adjusting methods in which frozen hard ice cream is crush-defrosted by means of crushing gears or toothed rollers.

CITATION LIST

Patent Literature

PTL 1: JP3433344
PTL 2: JP2005-130840A
PTL 3: JP2004-129628A
PTL 4: JP2003-135005A

SUMMARY OF INVENTION

Technical Problem

If an apparatus capable of adjusting the temperature of frozen food (frozen ice cream) in a short period of time through a simple operation and maintenance and capable of serving soft ice cream and the like can be provided, sales opportunity loss and inventory surplus can be suppressed "without the need for a temperature adjusting freezer." This will improve the quality of the ice cream as well as make it possible to serve smooth and soft ice cream and the like at a store.

Further, this will make it possible to easily prepare and enjoy smooth and soft ice cream in households.

Incidentally, it is hard to say that the temperature adjusting methods and the temperature adjusting apparatuses disclosed in the prior art literatures are suitable for frozen food temperature adjusting apparatuses for business use and household use.

In view of the foregoing, it is a principal object of the present invention to provide a frozen food temperature adjusting apparatus which is capable of adjusting the temperature of frozen food, particularly, ice cream type products such as frozen confectionary and frozen drink, in a short period of time to process the frozen food into smooth and soft food.

It is another object of the present invention to provide a packaging container suitable for packaging frozen confectionary or frozen drink.

Solution to Problem

According to an inventive aspect of claim 1, there is provided a frozen food temperature adjusting apparatus, which includes a setting mechanism in which a temperature adjustment object is placed, a heat exchanging/pressing mechanism which exchanges heat with the temperature adjustment object placed in the setting mechanism while pressing the temperature adjustment object, and a serving mechanism which receives the temperature-adjusted temperature adjustment object and serves the temperature-adjusted temperature adjustment object in a predetermined container.

According to an inventive aspect of claim 2, the frozen food temperature adjusting apparatus of claim 1 is characterized in that the temperature adjustment object is frozen food contained in a predetermined packaging container and freeze-stored in a solid state, and the predetermined packaging container includes a flexible bag-shaped container of a resin.

According to an inventive aspect of claim 3, the frozen food temperature adjusting apparatus of claim 1 or 2 is characterized in that the heat exchanging/pressing mechanism includes a pressing member having an arcuate or convexly curved contact surface and made of a material having a higher heat conductivity, and a driving member which presses the contact surface of the pressing member against the temperature adjustment object while pivotally moving the contact surface of the pressing member.

According to an inventive aspect of claim 4, the frozen food temperature adjusting apparatus of claim 2 or 3 is characterized in that the setting mechanism includes an upper portion supporting device which supports an upper portion of the bag-shaped container containing the temperature adjustment object, and a lower portion holding/guiding device which holds a lower portion of the bag-shaped container and guides a portion of the temperature-adjusted temperature adjustment object flowing out of the lower portion of the bag-shaped container.

According to an inventive aspect of claim 5, the frozen food temperature adjusting apparatus of claim 2 is characterized in that the bag-shaped container includes a first sheet defining one of opposite surfaces thereof, and a second sheet superposed on the first sheet and defining the other surface thereof, wherein the first sheet and the second sheet are bonded to each other on an upper side and left and right sides thereof so as not to separate from each other to define a storage chamber therebetween, and lower portions of the first sheet and the second sheet are weakly sealed to each other so as to be unsealed when a pressure not lower than a predetermined pressure level is applied to the storage chamber.

According to an inventive aspect of claim 6, the frozen food temperature adjusting apparatus of claim 4 or 5 is characterized in that the lower portion holding/guiding device includes: a nozzle mechanism which has a plurality of articulations and includes a first polyarticular member horizontally elongated and horizontally foldable, and a second polyarticular member paired with the first polyarticular member and extending parallel to the first polyarticular member; and a driving member which shifts the first polyarticular member and the second polyarticular member into a closed state in which the first polyarticular member and the second polyarticular member extend parallel to each other to hold the lower portion of the bag-shaped container therebetween, and an open state in which longitudinally middle articulations of the first polyarticular member and the second polyarticular member are spaced a maximum distance from each other.

According to an inventive aspect of claim 7, the frozen food temperature adjusting apparatus of any one of claims 1 to 6 is characterized in that the serving mechanism includes a placement table for placing a cup as the predetermined container, and a driving device for rotating and moving up and down the placement table.

According to an inventive aspect of claim 8, the frozen food temperature adjusting apparatus of claim 7 is characterized in that the placement table includes a base on which the cup is placed in a tilted state.

According to an inventive aspect of claim 9, the frozen food temperature adjusting apparatus of any one of claims 1 to 8 is characterized in that the serving mechanism further includes a spoon feeding mechanism which sets a spoon with respect to the temperature-adjusted temperature adjustment object served in the predetermined container.

According to an inventive aspect of claim 10, there is provided a packaging container for freeze-storing frozen food in a solid state, the packaging container being a flexible bag-shaped container of a resin, the packaging container including a first sheet defining one of opposite surfaces thereof, and a second sheet superposed on the first sheet and defining the other surface thereof, wherein the first sheet and the second sheet are bonded to each other on an upper side and left and right sides thereof so as not to separate from each other to define a storage chamber therebetween, and a lower portion of the packaging container is weakly sealed so as to be unsealed when a pressure not lower than a predetermined pressure level is applied to the storage chamber.

According to an inventive aspect of claim 11, the packaging container of claim 10 has a generally vertically elongated rectangular shape as viewed in front elevation, and the lower portion of the packaging container includes a strongly sealed portion provided at a lower end thereof and is configured so that, when the strongly sealed portion is cut away, an outlet appears in the weakly sealed portion.

According to an inventive aspect of claim 12, the packaging container of claim 10 or 11 is characterized in that the storage chamber defined between the first sheet and the second sheet includes a plurality of chambers.

According to an inventive aspect of claim 13, the packaging container of claim 12 is characterized in that lower portions of the plural chambers are closed by a common weakly sealed portion.

According to an inventive aspect of claim 14, there is provided a gelato server, which includes: a setting mechanism in which packed ice cream is placed; a temperature adjusting device for adjusting the temperature of the packed ice cream placed in the setting mechanism to a desired temperature level; and a receiving portion which receives the temperature-adjusted ice cream; wherein the temperature adjusting device includes a kneading roller including a plurality of metal rollers disposed parallel to each other in circumferentially equidistantly spaced relation and a pair of disks which hold opposite ends of each of the plural metal rollers, first driving means which moves up and down the kneading roller, and second driving means which moves the kneading roller forward and rearward.

According to an inventive aspect of claim 15, the gelato server of claim 14 includes locking means which locks rotation of the kneading roller with a specific one of the plural metal rollers rotated to a forwardmost position.

According to an inventive aspect of claim 16, the gelato server of claim 14 or 15 is characterized in that the plural metal rollers per se are each rotatably supported by the pair of disks.

According to an inventive aspect of claim 17, the gelato server of claim 16 is characterized in that the setting mechanism includes a pressing plate to be brought into abutment against one of opposite side surfaces of the packed ice cream, a support frame opposed to and spaced a predetermined distance from the pressing plate to support the other side surface of the packed ice cream opposite from the one side surface, and an engagement member provided on an upper portion of the support frame for engagement with an upper portion of a package containing the ice cream.

According to an inventive aspect of claim 18, the gelato server of claim 17 is characterized in that the kneading roller is brought into abutment against the other side surface of the packed ice cream to perform a kneading operation on the packed ice cream from the other side surface.

According to an inventive aspect of claim 19, the gelato server of claim 18 includes an opening/closing door for opening and closing the setting mechanism, wherein the pressing plate is provided on an inner side of the opening/closing door.

According to an inventive aspect of claim 20, the gelato server of claim 19 is characterized in that the pressing plate includes a temperature sensor to be brought into abutment against the one side surface of the packed ice cream for measuring the temperature of the packed ice cream.

According to an inventive aspect of claim 21, the gelato server of claim 18 is characterized in that the temperature adjusting device has a temperature adjusting mode in which the plural metal rollers of the kneading roller exchange heat with the packed ice cream and press the packed ice cream to perform a temperature adjustment process by rotating the kneading roller, moving the kneading roller up and down, and moving the kneading roller forward and rearward, and an extruding mode in which the temperature-adjusted ice cream is extruded from the package by moving down the kneading roller with the rotation of the kneading roller locked by the locking means and with the kneading roller located at the forwardmost position.

According to an inventive aspect of claim 22, the gelato server of claim 21 is characterized in that the receiving portion includes a base on which a container is placed below the setting mechanism, and that the base is slidable forward and rearward, and has an opening through which the package is received when the package falls from the setting mechanism with the base moved forward, and includes a box communicating with the opening.

Effects of the Invention

In the frozen food temperature adjusting apparatus according to the prevent invention, the frozen food can be advantageously temperature-adjusted in a short period of time through the heat exchanging and pressing operation. Further, the entire frozen food can be uniformly temperature-adjusted to be thereby free from nonuniformity and instability in quality, which may otherwise occur due to uneven temperature adjustment. The frozen food is prevented from being exposed to the exterior or adhering to the machine (apparatus) in the process sequence from the temperature adjustment to the serving, because the temperature-adjusted food is served in the predetermined container through the process sequence.

Therefore, the machine (apparatus) does not require a cleaning process, and is free from any sanitary problem.

In the gelato server according to the present invention, the kneading roller includes the plural metal rollers, so that the temperature of the frozen ice cream can be advantageously adjusted in a short period of time through the heat exchanging and pressing operation performed by the plural metal rollers. Further, the entire frozen ice cream can be uniformly temperature-adjusted. Therefore, the ice cream is free from uneven temperature adjustment, i.e., nonuniformity and instability in quality, which may otherwise occur due to the uneven temperature adjustment. The ice cream (gelato) is prevented from being exposed to the exterior or adhering to the machine (apparatus) in the process sequence from the temperature adjustment to the serving, because the temperature-adjusted ice cream is extruded from the package through the process sequence.

Thus, the gelato server is excellent in sanitary aspect.

The packaging container according to the present invention is suitable for the temperature adjustment through the heat exchanging and pressing operation. In addition, the outlet for the temperature-adjusted content is closed by the weakly sealed portion, so that the outlet can be automatically unsealed by the application of the pressure not lower than the predetermined pressure level. Thus, the content can be reliably sanitarily extruded without inadvertent leakage thereof during the unsealing.

BRIEF DESCRIPTION OF DRAWINGS

FIG. 16 is a schematic front view for describing the structure and the operation of the gelato server 10, focusing on the serving mechanism.

FIG. 17 are diagrams showing an exemplary spoon.

FIG. 26 is a flow diagram showing an exemplary temperature adjustment process to be performed by the gelato server.

DESCRIPTION OF EMBODIMENTS

With reference to the drawings, embodiments of the present invention will hereinafter be described specifically.

Figure 1:
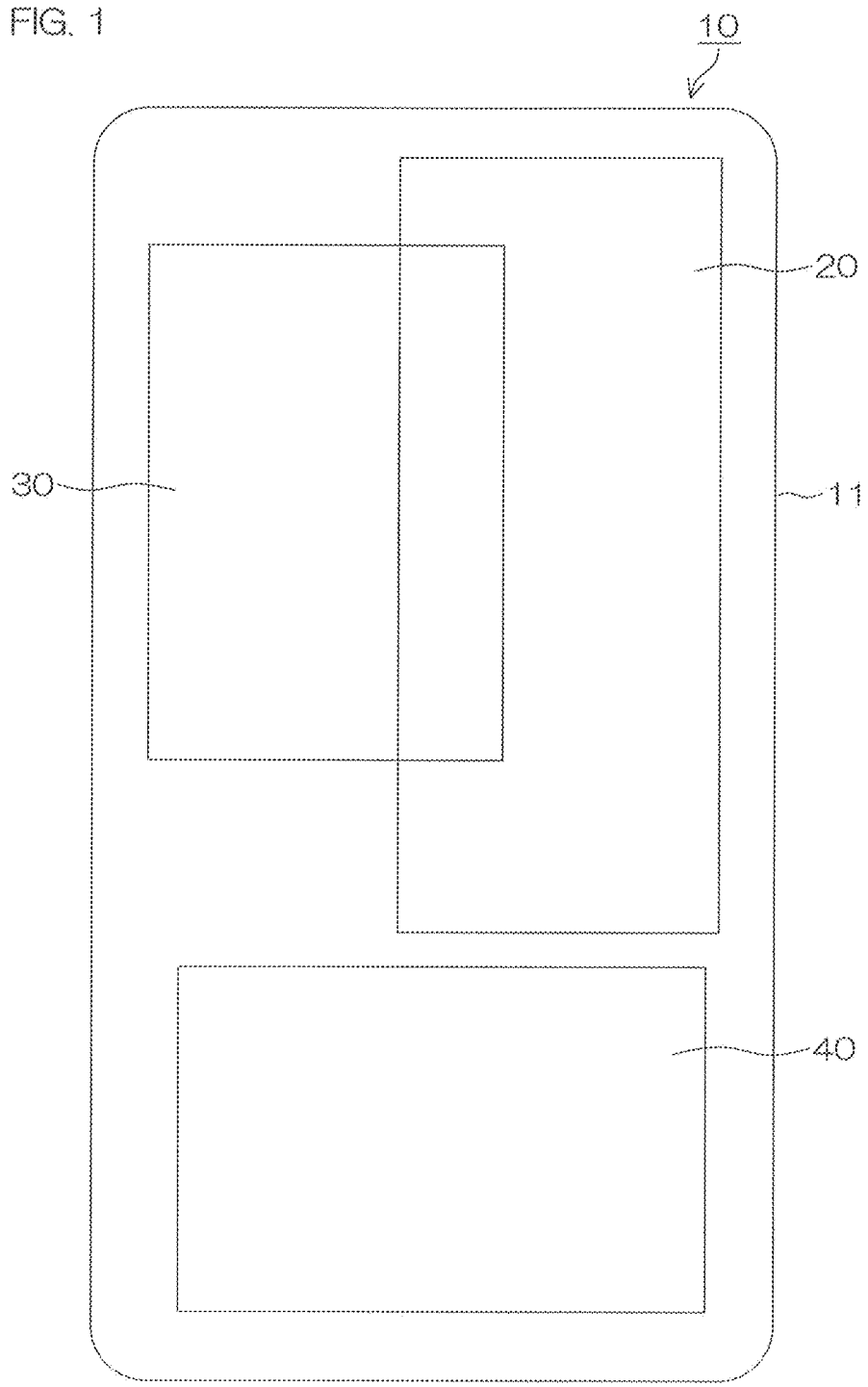
FIG. 1 is a schematic front view generally showing a gelato server 10 as a frozen food temperature adjusting apparatus according to one embodiment of the present invention.

FIG. 1 is a schematic front view generally showing a gelato server 10 as a frozen food temperature adjusting apparatus according to an embodiment of the present invention. The gelato server 10 includes a setting mechanism 20, a heat exchanging/pressing mechanism 30 and a serving mechanism 40 incorporated in a housing 11.

The setting mechanism 20 is a mechanism in which frozen food to be temperature-adjusted, i.e., ice cream packed in a predetermined packaging container and freeze-stored in a solid state (at not higher than about −20° C.), is set. The setting mechanism 20 includes a nozzle mechanism (to be described later) for guiding the temperature-adjusted ice cream downward.

The heat exchanging/pressing mechanism 30 includes a conductor made of a highly heat-conductive material (e.g., a metal such as copper or aluminum) and having a contact surface. The contact surface of the conductor is brought into press contact with the packaging container containing the frozen ice cream and set in the setting mechanism 20, whereby the temperature of the ice cream is adjusted to about −20° C. to about −5° C. by heat exchange between the conductor and the ice cream.

The serving mechanism 40 is a mechanism which receives the temperature-adjusted ice cream extruded and flowing down from the packaging container and serves the ice cream in a predetermined container (e.g., a cup).

The gelato server 10 according to this embodiment is an apparatus adapted to automatically perform an ice cream temperature adjusting operation, an ice cream extruding operation and an ice cream serving operation after the packaging container containing the ice cream is set in the setting mechanism 20 and a start switch is operated. The apparatus requires only a short period of time (up to about 120 seconds) for the temperature adjustment.

Figure 2:
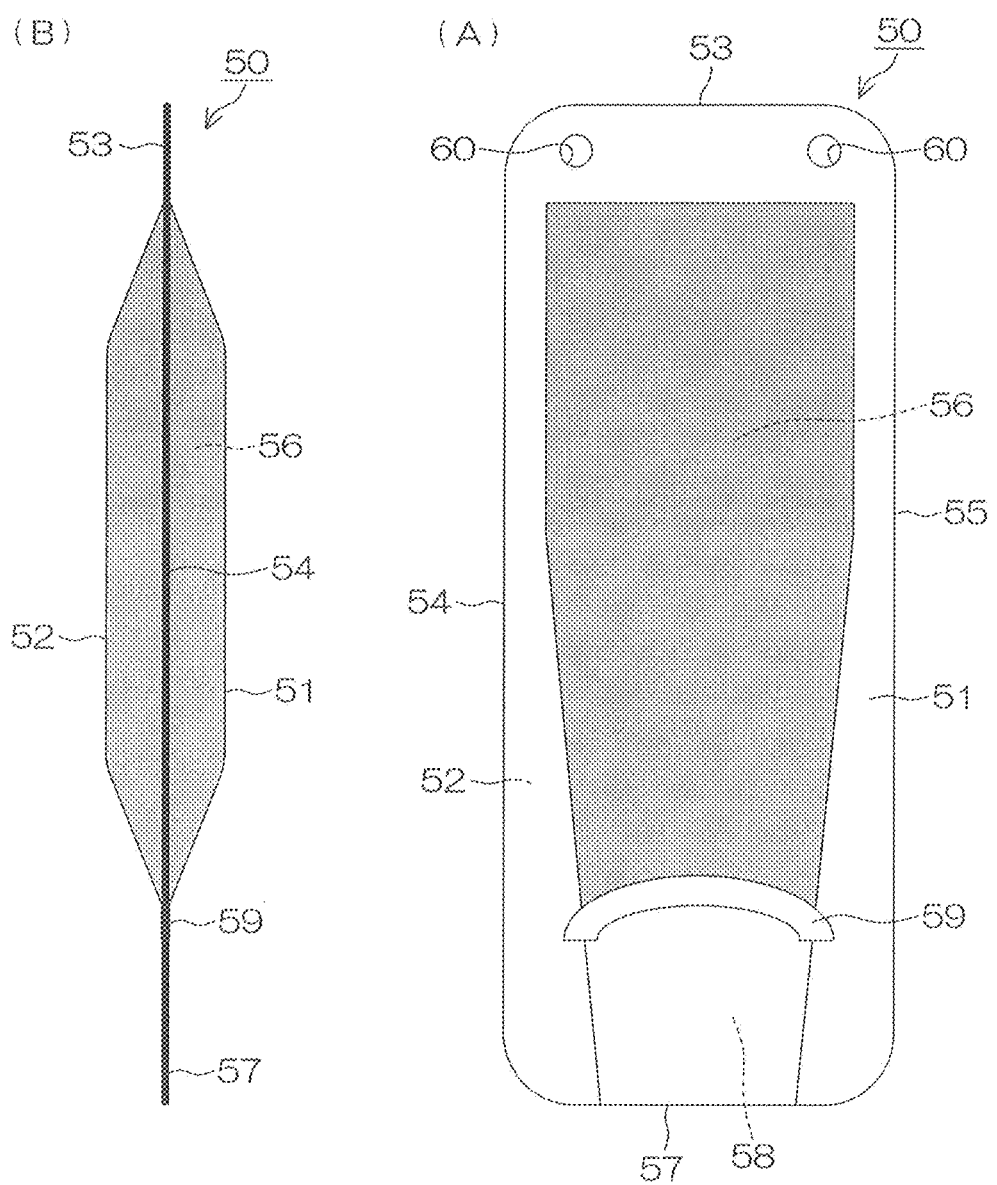
FIG. 2 are a schematic front view (FIG. 2(A)) and a schematic side view (FIG. 2(B)), respectively, of a packaging container according to the embodiment of the present invention.

FIG. 2(A) is a schematic front view of a packaging container 50 according to the one embodiment of the present invention, and FIG. 2(B) is a schematic left side view of the packaging container 50.

The packaging container 50 is a bag-shaped container made of a flexible resin, e.g., a soft plastic film. More specifically, the packaging container 50 has a vertically elongated rectangular bag-like storage chamber 56 formed, for example, by heat-sealing upper portions (upper edge portions) 53 and left and right side portions (left and right edge portions) 54, 55 of two round-cornered vertically elongated rectangular film sheets 51, 52 as viewed in front elevation to prevent separation of the film sheets 51, 52. Various resin materials including thermoplastic resins such as polyethylenes, polypropylenes and polystyrenes are usable as a material for the film sheets 51, 52. The resin materials may include nylon (polyamides), PET (polyethylene terephthalates) and the like. The film sheets 51, 52 are not limited to single-layer film sheets, but may be multilayer film sheets. For example, triple-layer film sheets may be employed, which each include inner and outer layers of a polyolefin such as polyethylene or polypropylene, and an intermediate layer of a cycloolefin copolymer.

Instead of the two film sheets 51, 52, a single film sheet may be employed. The bag-like storage chamber 56 may be formed by folding the single film sheet and heat-sealing a peripheral portion of the folded film sheet.

The packaging container 50 may have hook holes 60 provided in the upper portion 53 for hanging the packaging container 50 set in the setting mechanism 20.

In FIGS. 2(A) and 2(B), shaded portions each denote a content of the packaging container, i.e., the ice cream packed in the packaging container.

A feature of the packaging container 50 according to this embodiment is that an outlet port 58 of the bag-like storage chamber 56 provided in a lower portion (lower edge portion) 57 of the two film sheets 51, 52 is closed by a weakly sealed portion 59. The weakly sealed portion 59 can be unsealed by increasing the internal pressure of the bag-like storage chamber 56. That is, even if the packaging container 50 is pressed when the ice cream contained in the bag-like storage chamber 56 is frozen in a solid state, the internal pressure of the bag-like storage chamber 56 is not increased so that the weakly sealed portion 59 is not unsealed. In contrast, if the ice cream contained in the bag-like storage chamber 56 is temperature-adjusted to be thereby fluidized, a pressure applied to the packaging container 50 is transmitted to the weakly sealed portion 59 via the ice cream fluidized in the bag-like storage chamber 56, and the weakly sealed portion 59 is unsealed when a pressure not lower than a predetermined pressure level is applied to the weakly sealed portion 59.

The weakly sealed portion 59 may be imparted with a lower sealing strength by the heat-sealing so as to be unsealed with an internal pressure of not lower than the predetermined pressure level. Where the packaging container 50 is formed by using a multilayer film having a triple-layer structure susceptible to interlayer separation (e.g., a multilayer film including a polycycloolefin layer sandwiched between polyethylene layers, or a multilayer film including a polypropylene layer sandwiched between polyethylene layers), for example, the weakly sealed portion 59 can be easily unsealed through the interlayer separation by application of an internal pressure of not lower than the predetermined pressure level.

The structure of the packaging container 50 described with reference to FIGS. 2(A) and 2(B) is based on the one embodiment, and the packaging container according to the present invention is not limited to this structure. For example, the front elevational shape of the packaging container is not limited to the round-cornered vertically elongated rectangular shape, but may be any shape.

Instead of the resin sheets, aluminum films, aluminum-deposited sheets or the like may be used as the film sheets for the packaging container. The sheets may be bonded to each other with the use of an adhesive agent rather than by the heat sealing.

Figure 3:
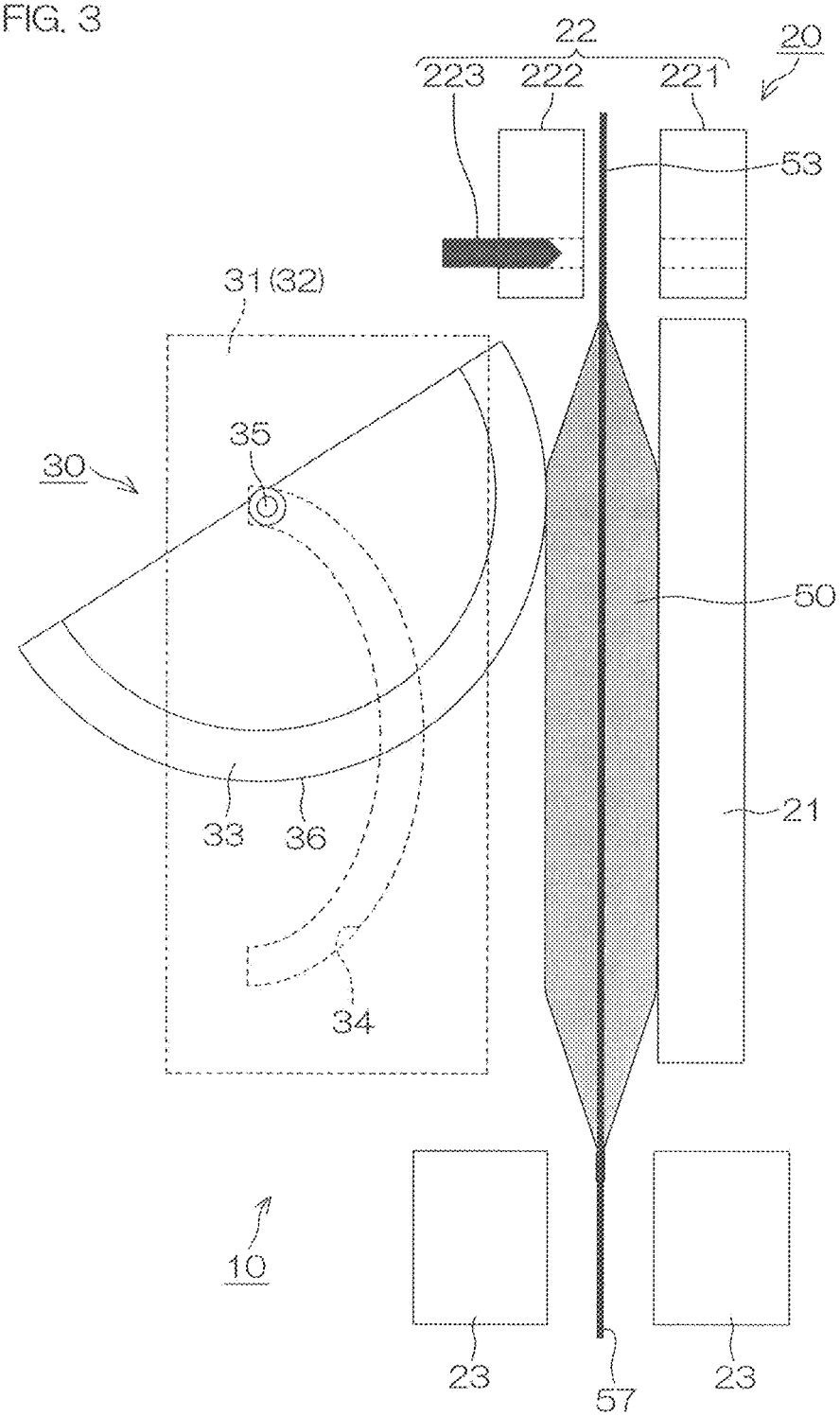
FIG. 3 is a schematic front view for describing principal mechanisms and operation of the gelato server 10.
Figure 4:
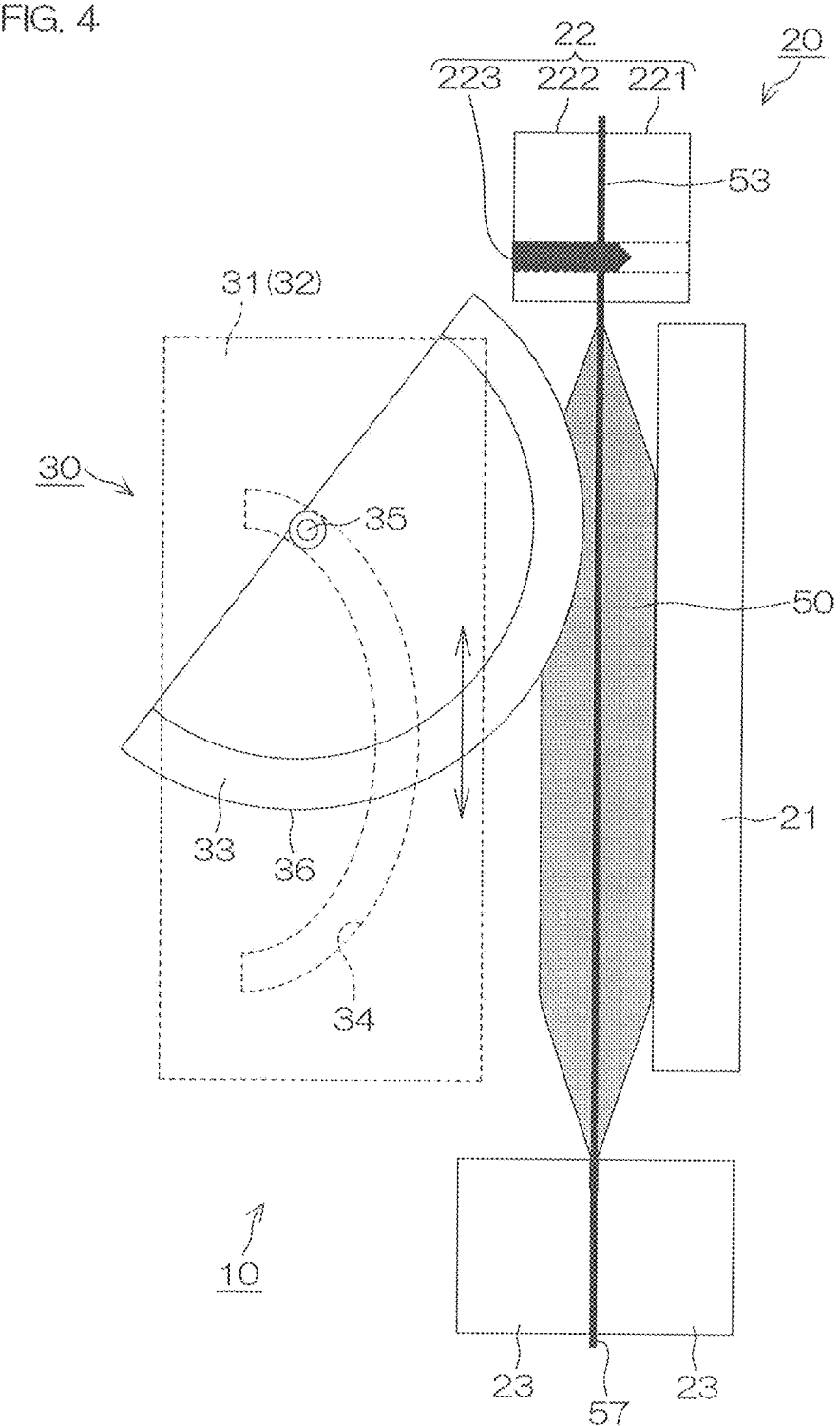
FIG. 4 is a schematic front view for describing the principal mechanisms and the operation of the gelato server 10.
Figure 5:
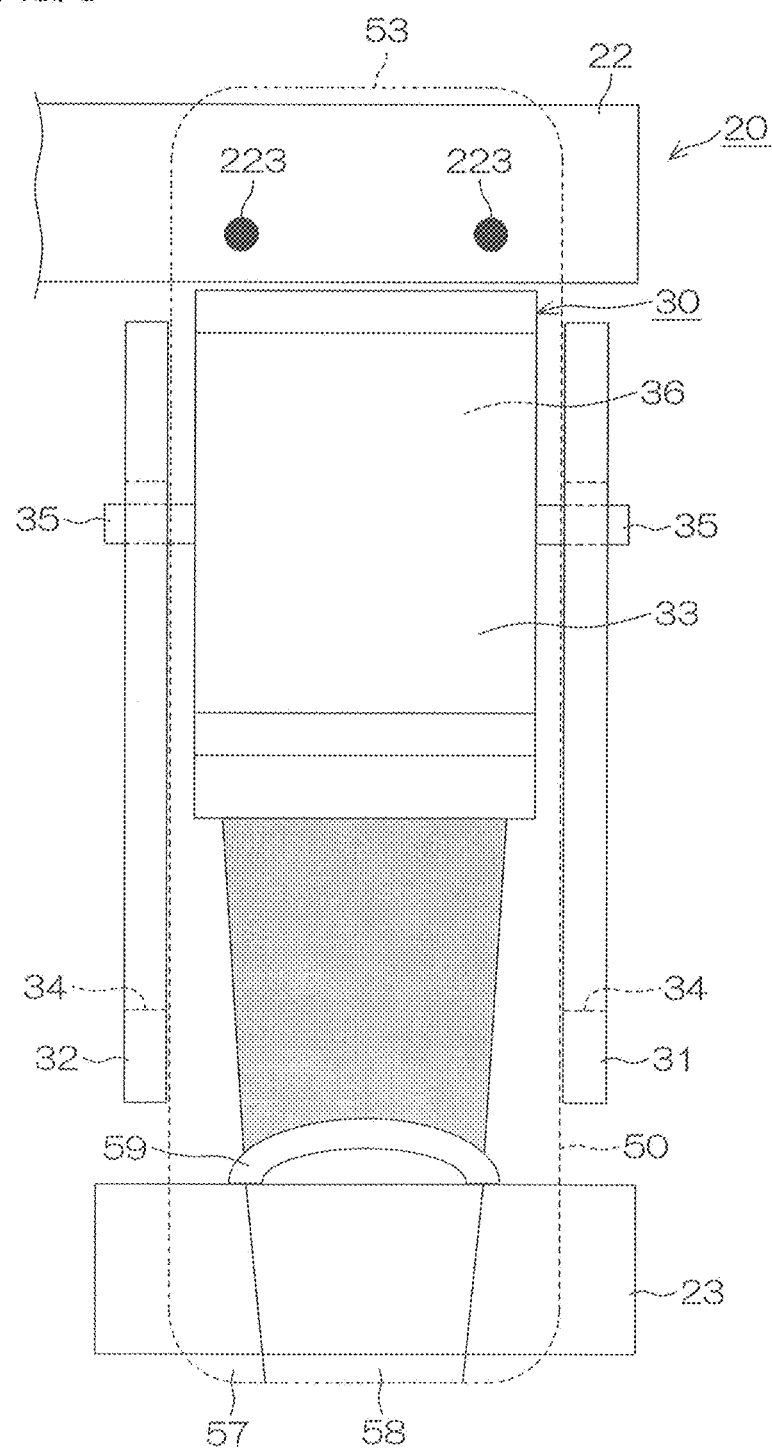
FIG. 5 is a schematic side view for describing the principal mechanisms and the operation of the gelato server 10.

FIGS. 3 to 7 are schematic diagrams for describing the structures and the operations of the principal mechanisms of the gelato server 10. FIGS. 3, 4, 6 and 7 are front views, and FIG. 5 is a side view.

Referring now to FIGS. 3 and 5, the gelato server includes the setting mechanism 20 and the heat exchanging/pressing mechanism 30.

The setting mechanism 20 includes a container guide plate 21, an upper portion supporting device 22 provided above the container guide plate 21, and a lower portion holding/guiding device 23 provided below the container guide plate 21.

The container guide plate 21 is brought into abutment against one of opposite major surfaces of the set packaging container 50 to receive the one major surface of the packaging container 50. The container guide plate 21 may be made of, for example, a resin plate, and may have an undulated or curved surface which properly abuts against the surface of the packaging container 50. Alternatively, the container guide plate 21 may be made of a metal plate so as to exchange heat with the packaging container 50.

The upper portion supporting device 22 is adapted to support the upper portion 53 of the packaging container 50, and includes a pair of openable guide bars 221, 222, and lock pins 223 provided in association with the pair of guide bars 221, 222 for fixing the upper portion 53 of the packaging container 50 between the guide bars 221, 222 with the pair of guide bars 221, 222 closed. The guide bars 221, 222 may have a transport function for transporting the packaging container 50 as will be described later. The opening and the closing of the guide bars 221, 222 and the locking and unlocking of the lock pins 223 are carried out by a link mechanism not shown.

The lower portion holding/guiding device 23 holds the lower portion 57 of the packaging container 50, and guides the temperature-adjusted ice cream flowing out from the lower portion 57 of the packaging container 50.

The heat exchanging/pressing mechanism 30 is disposed in opposed relation to the container guide plate 21 of the setting mechanism 20. That is, the heat exchanging/pressing mechanism 30 is disposed in a position such that it can abut against the other major surface of the packaging container 50 with the one major surface of the packaging container 50 received on the container guide plate 21.

The heat exchanging/pressing mechanism 30 includes a pair of side frames 31, 32, and a blotter-type pressing member 33 (conductor) pivotally supported between the pair of side frames 31, 32. The pair of side frames 31, 32 each have a guide groove 34 uniquely curved to be bulged toward the container guide plate 21. The pressing member 33 includes a support bar 35 projecting to opposite sides thereof. The support bar 35 is engaged with the guide grooves 34 of the respective side frames 31, 32. Therefore, the pressing member 33 is capable of moving pivotally about the support bar 35 while being guided by the guide grooves 34. The pressing member 33 includes an arcuate or convexly curved contact surface 36 which presses the other major surface of the packaging container 50.

The pressing member 33 is made of a material having a higher heat conductivity, e.g., a highly heat conductive metal material, and is adapted for heat exchange between the pressing member 33 and the packaging container 50 when the contact surface 36 is kept in press contact with the packaging container 50.

Figure 8:
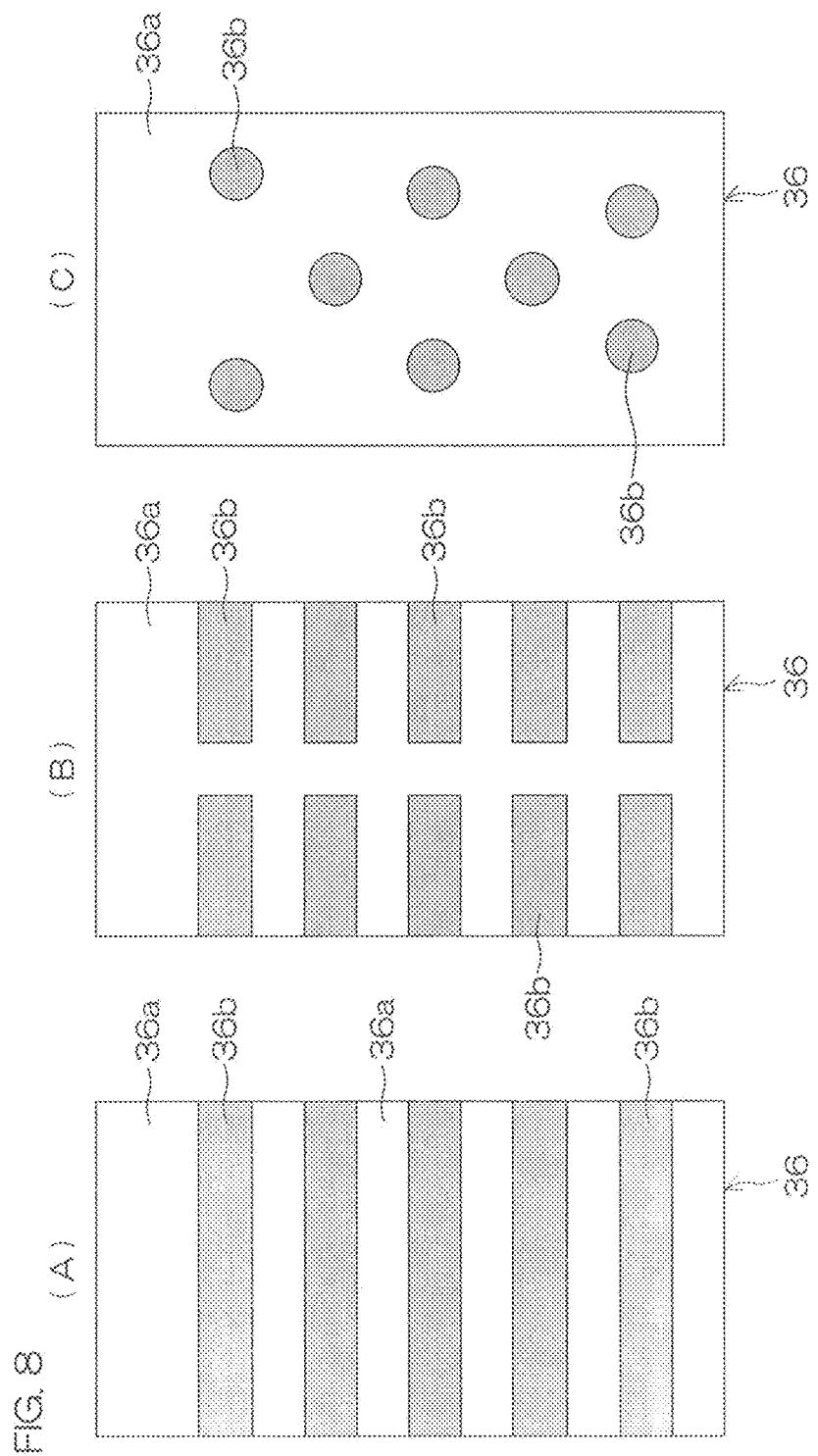
FIGS. 8(A), 8(B) and 8(C) are diagrams showing exemplary surface patterns of a contact surface 36 of a pressing member 33.

FIG. 8 are schematic diagrams of the blotter-type pressing member 33 as viewed in front elevation, illustrating exemplary surface patterns of the contact surface 36.

The contact surface 36 may be entirely a metal surface. As shown in FIG. 8(A), 8(B) or 8(C), the overall heat conductivity of the contact surface 36 may be adjusted by dispersively or regularly arranging small-area pieces made of a material having a lower heat conductivity (e.g., a rubber) on the metal surface. In FIGS. 8(A), 8(B) and 8(C), white areas 36a each denote the metal surface, and gray areas 36b each denote a rubber surface.

Driving operations for moving the support bar 35 up and down along the guide grooves 34 and moving the pair of side frames 31, 32 laterally as seen in FIG. 3 are performed by a link mechanism and an electric driving source (a motor or the like) not shown. The pair of side frames 31, 32 may be moved to the right as seen in FIG. 3 by an elastic force by using a spring or the like.

Next, the operation of the gelato server 10 will be described.

Referring first to FIG. 3, the packaging container 50 containing the frozen ice cream as a temperature adjustment object to be temperature-adjusted is set in the setting mechanism 20. That is, the packaging container 50 is set with the upper portion 53 thereof located upward and with the one major surface thereof fitted along the container guide plate 21. Then, the upper portion supporting device 22 and the lower portion holding/guiding device 23 are closed by operating an operation portion not shown to fix the upper portion 53 and the lower portion 57 of the packaging container 50 (see FIG. 4). The lock pins 223 of the upper portion supporting device 22 are inserted through the hook holes 60 provided in the upper portion 53 of the packaging container 50, whereby the upper portion 53 of the packaging container 50 is locked by the upper portion supporting device 22 (see FIGS. 4 and 5).

Referring next to FIG. 4, the support bar 35 of the pressing member 33 of the heat exchanging/pressing mechanism 30 is slowly moved vertically along the guide grooves 34. During the movement, the pressing member is moved pivotally about the support bar 35. Therefore, the contact surface 36 rolls in press contact with the other major surface of the packaging container 50 to thereby smoothly exchange heat with the content of the packaging container 50 (i.e., the ice cream). Thus, the temperature of the ice cream is efficiently adjusted.

Completion of the temperature adjustment of the ice cream by the heat exchanging/pressing mechanism 30 can be reliably detected, for example, by employing any of various sensor techniques such as a time sensor, a temperature sensor, an electric current sensor and a pressure sensor alone or in combination.

The simplest arrangement may be such that a predetermined time period (e.g., 90 seconds) is measured by a timer and the temperature adjustment is considered to be completed when the time is up.

Another arrangement may be such that the temperature sensor for measuring the temperature of the content of the packaging container 50 is provided and, when a temperature of −6° C. is detected by the temperature sensor, the temperature adjustment is considered to be completed.

Further another arrangement may be such that the electric current of the motor provided as the driving source for moving the support bar 35 vertically along the guide grooves 34 is measured and, when an electric current value is reduced to not higher than a predetermined level with a load reduced, the temperature adjustment is considered to be completed.

Further, the completion of the temperature adjustment may be detected when a pressure detected by a surface pressure sensor provided, for example, in a center portion of the container guide plate 21 is reduced to not higher than a predetermined level.

Figure 6:
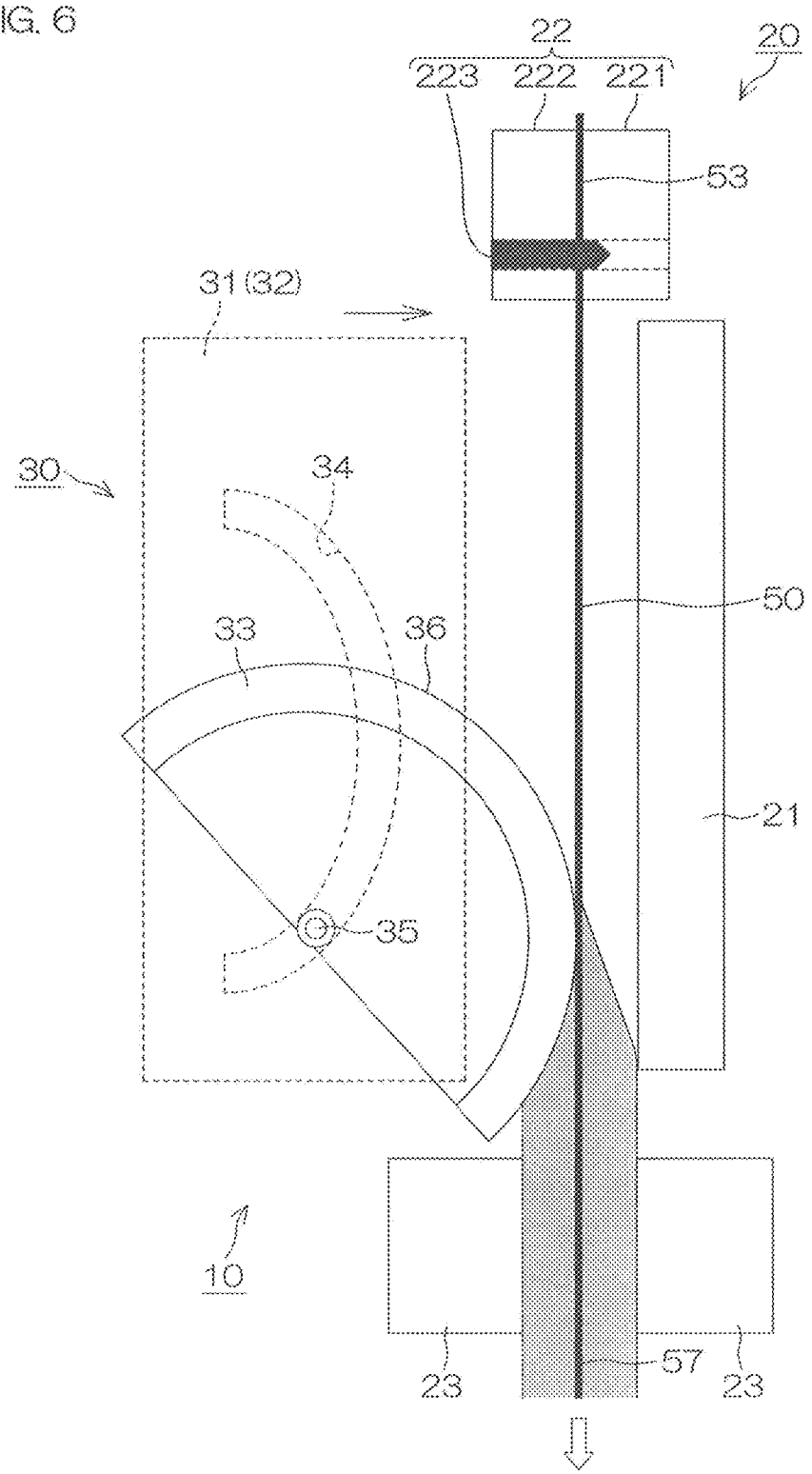
FIG. 6 is a schematic front view for describing the principal mechanisms and the operation of the gelato server 10.

Referring next to FIG. 6, the lower portion holding/guiding device 23 is partly opened after the temperature adjustment of the ice cream contained in the packaging container 50 is completed. The side frames 31, 32 of the heat exchanging/pressing mechanism 30 are shifted toward the container guide plate 21. At this time, the container guide plate 21 may also be shifted toward the heat exchanging/pressing mechanism 30. The support bar 35 is moved to uppermost portions of the guide grooves 34, and slowly moved down along the guide grooves 34 from this state. Thus, the contact surface 36 of the pressing member 33 held pivotally about the support bar 35 is pressed against the packaging container 50, cooperating with the container guide plate 21 to hold the packaging container 50. The contact surface 36 is moved downward from the upper side to squeeze the packaging container 50, thereby extruding the temperature-adjusted ice cream from the packaging container 50. When the temperature-adjusted ice cream is continuously pressed downward from the upper side, the pressure exceeds the sealing force of the weakly sealed portion 59 closing the lower portion 57 of the packaging container 50, whereby the weakly sealed portion 59 is opened. Thus, the temperature-adjusted ice cream contained in the bag-like storage chamber 56 of the packaging container 50 is extruded downward from the outlet port 58 of the lower portion 57 to flow out.

Figure 7:
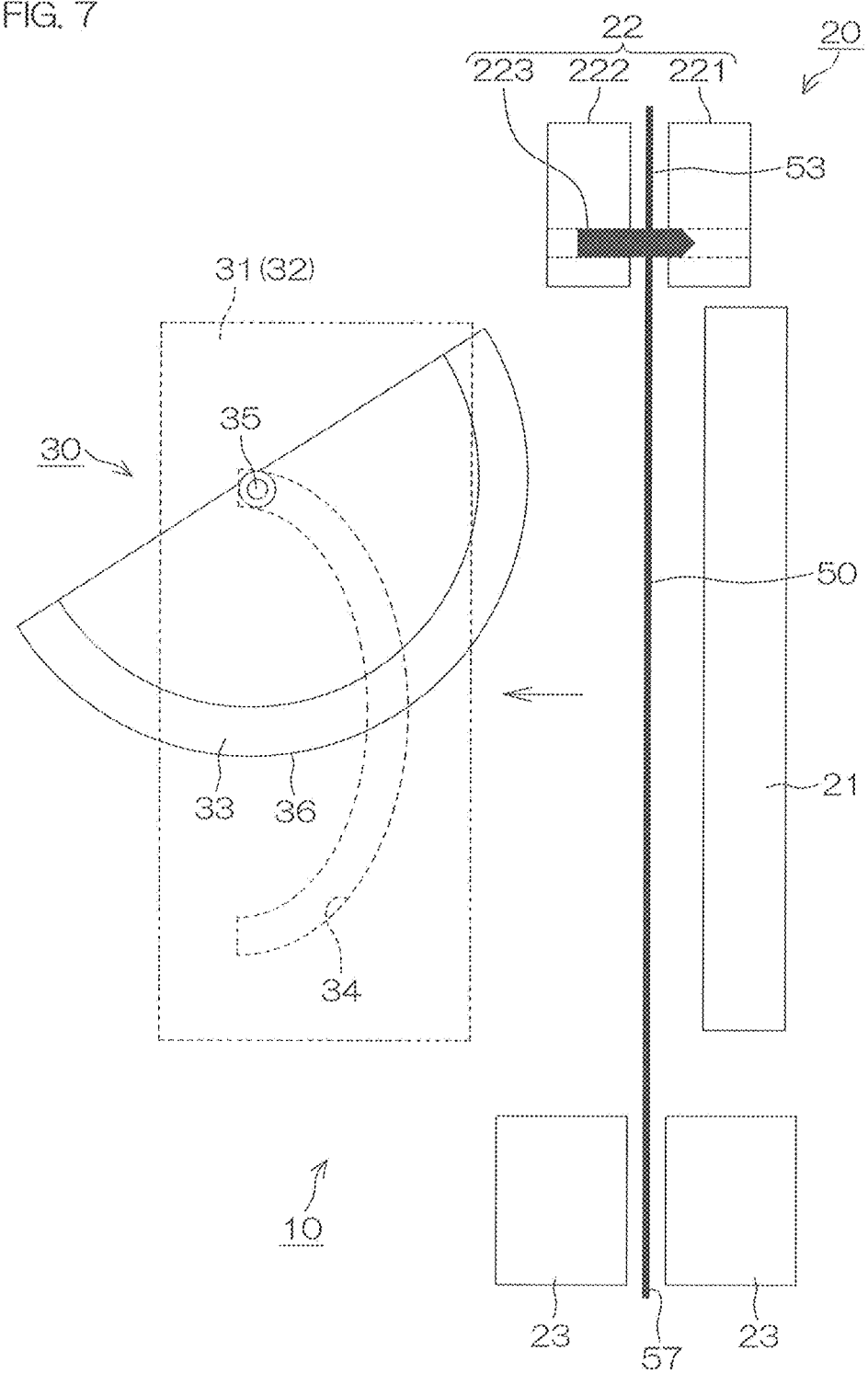
FIG. 7 is a schematic front view for describing the principal mechanisms and the operation of the gelato server 10.

FIG. 7 is a schematic diagram for describing the state and the operation of the gelato server 10 after the ice cream flows out of the packaging container 50. Referring to FIG. 7, after the ice cream is extruded from the packaging container 50, the lower portion holding/guiding device 23 is closed, whereby the opening of the lower portion 57 of the packaging container 50 is closed. Further, the heat exchanging/pressing mechanism 30 is moved to the left as seen in FIG. 7, and cooperates with the container guide plate 21 to release the packaging container 50 from the holding state. At this time, the upper portion 53 of the packaging container 50 is kept locked by the lock pins 223 of the upper portion supporting device 22.

In this state, the upper portion 53 and the lower portion 57 of the empty packaging container 50 are respectively held by the upper portion supporting device 22 and the lower portion holding/guiding device 23. Then, the empty packaging container 50 is transported rearward (backward perpendicularly to the paper face in FIG. 7) by the upper portion supporting device 22.

In this embodiment, the description is directed to the arrangement in which the empty packaging container 50 is transported rearward by the upper portion supporting device 22, not by way of limitation. For example, a user may take out the empty packaging container 50. That is, the upper portion supporting device 22 (and the lower portion holding/guiding device 23) may have a simpler structure without the transportation function.

Figure 9:
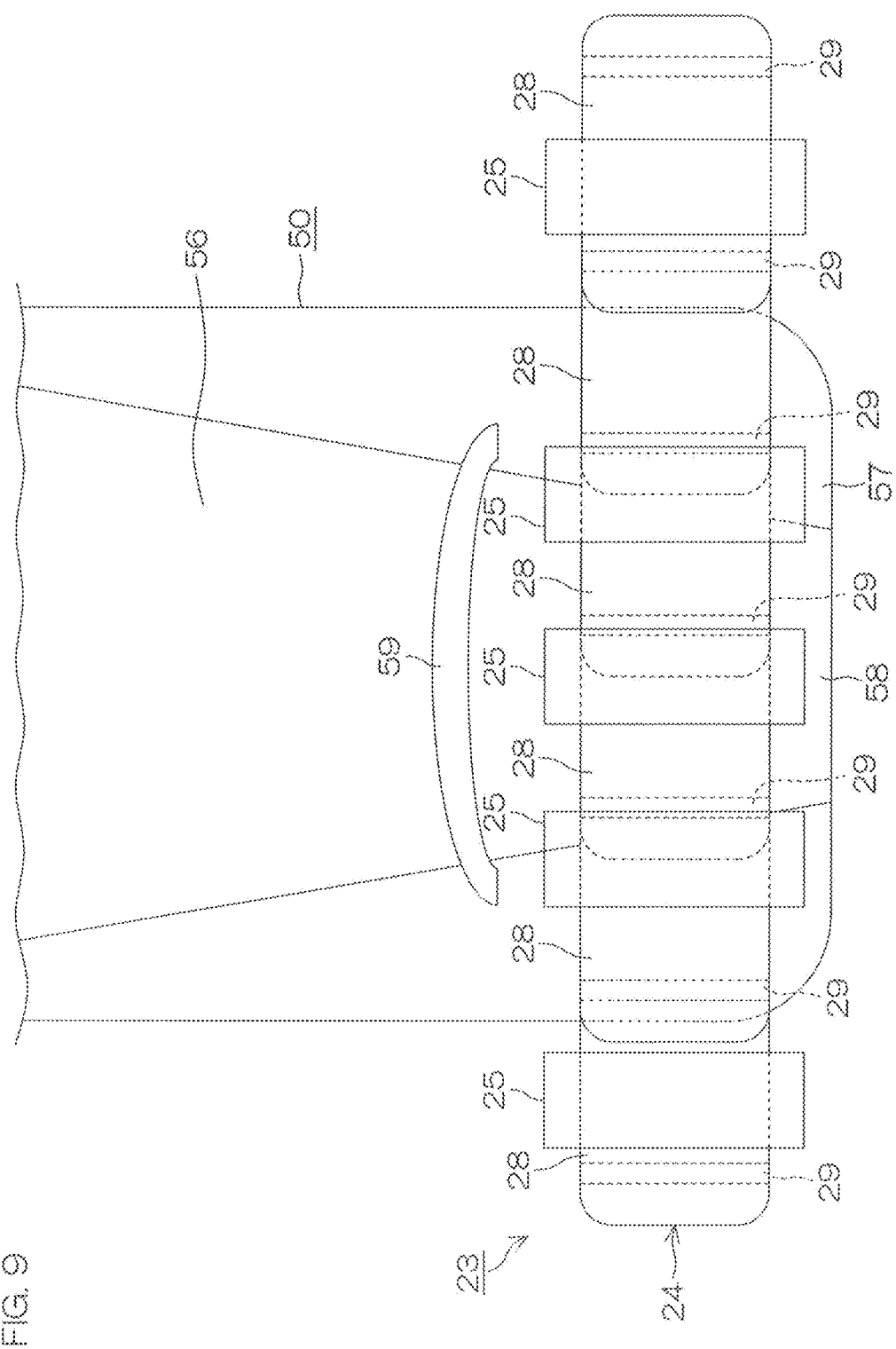
FIG. 9 is a schematic side view showing an exemplary structure of a lower portion holding/guiding device (nozzle mechanism).
Figure 10:
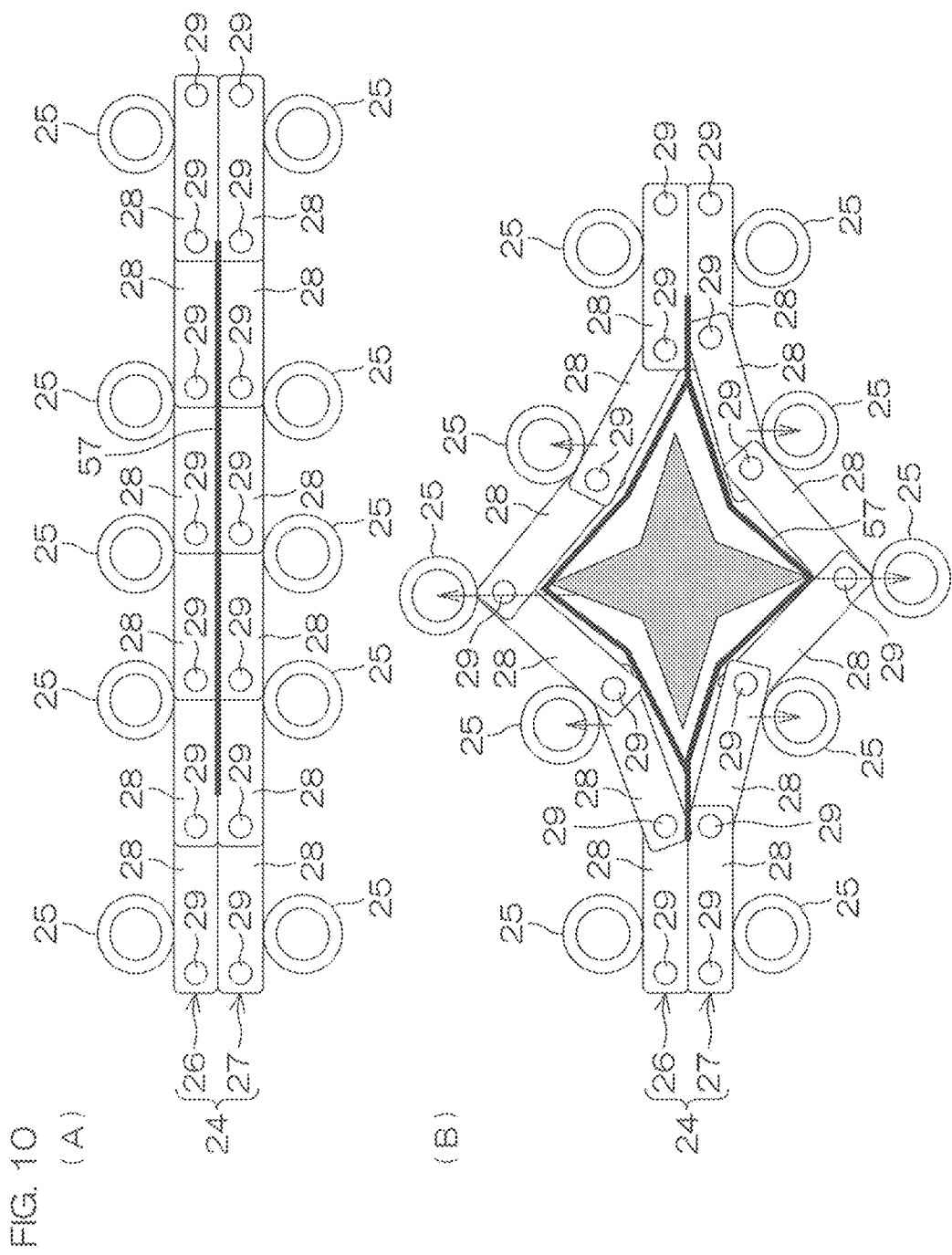
FIG. 10 are schematic plan views showing an exemplary structure of the lower portion holding/guiding device (nozzle mechanism) with its nozzle closed (FIG. 10(A)) and with its nozzle open (FIG. 10(B)).

FIG. 9 is a schematic side view for describing the structure of the lower portion holding/guiding device 23, and FIGS. 10(A) and 10(B) are schematic plan views of FIG. 9. Referring to FIGS. 9 and 10, the lower portion holding/guiding device 23 will be described in greater detail.

The lower portion holding/guiding device 23 includes a nozzle mechanism 24, and a plurality of guide rods 25, which are parts of a driving member for driving the nozzle mechanism 24.

The nozzle mechanism 24 has a pair of polyarticular members 26, 27 including a first polyarticular member 26 and a second polyarticular member 27. The first polyarticular member 26 and the second polyarticular member 27 have the same structure, and are each configured so that a plurality of small piece members 28 are connected to each other in horizontally foldable manner by a plurality of vertically extending connection pins 29 to be formed into a horizontally elongated shape as a whole.

The guide rods 25 are respectively connected to outer portions of the small piece members 28 generally in association with the small piece members 28. The guide rods 25 are selectively moved so that the first polyarticular member 26 and the second polyarticular member 27 can be shifted between a closing state (see FIG. 10(A)) in which the first polyarticular member 26 and the second polyarticular member 27 extend parallel to each other to hold the lower portion 57 of the packaging container 50 therebetween, and an opening state (see FIG. 10(B)) in which longitudinally middle portions of the first polyarticular member 26 and the second polyarticular member 27 are spaced from each other.

In the opening state, as shown in FIG. 10(B), the nozzle mechanism 24 is folded at the articulations thereof to be opened in a star shape. Therefore, the lower portion 57 of the bag-shaped container 50 held in the star-shaped opening is opened in a star shape when the ice cream flows down. There is no possibility that the ice cream flowing down is brought into direct contact with the nozzle mechanism 24 to contaminate the nozzle mechanism 24.

FIGS. 11 to 14 are schematic side views for describing the mechanism and the operation of the gelato server 10, focusing the serving mechanism 40.

Figure 11:
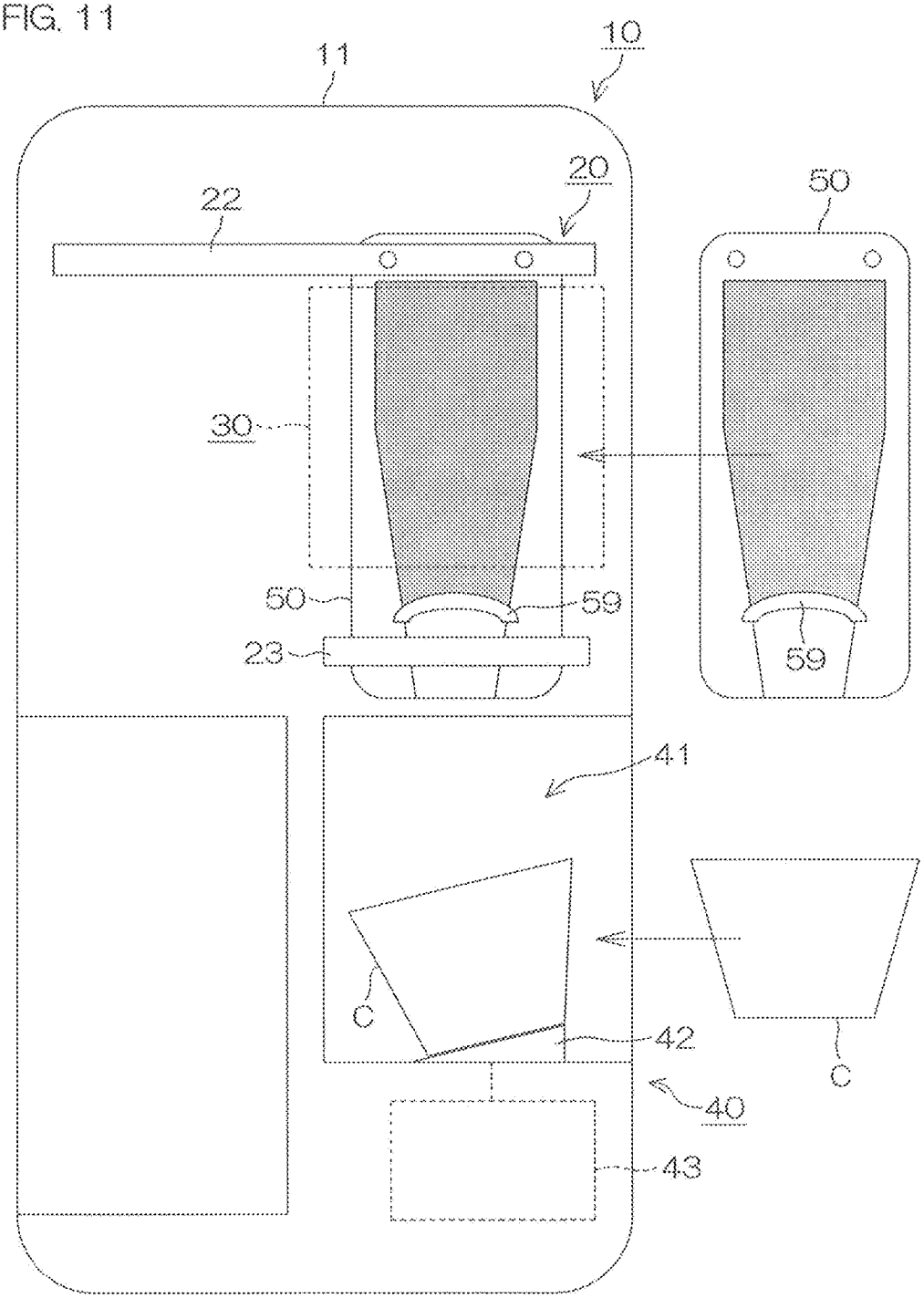
FIG. 11 is a schematic side view for describing the structure and the operation of the gelato server 10, focusing on a serving mechanism.
Figure 12:
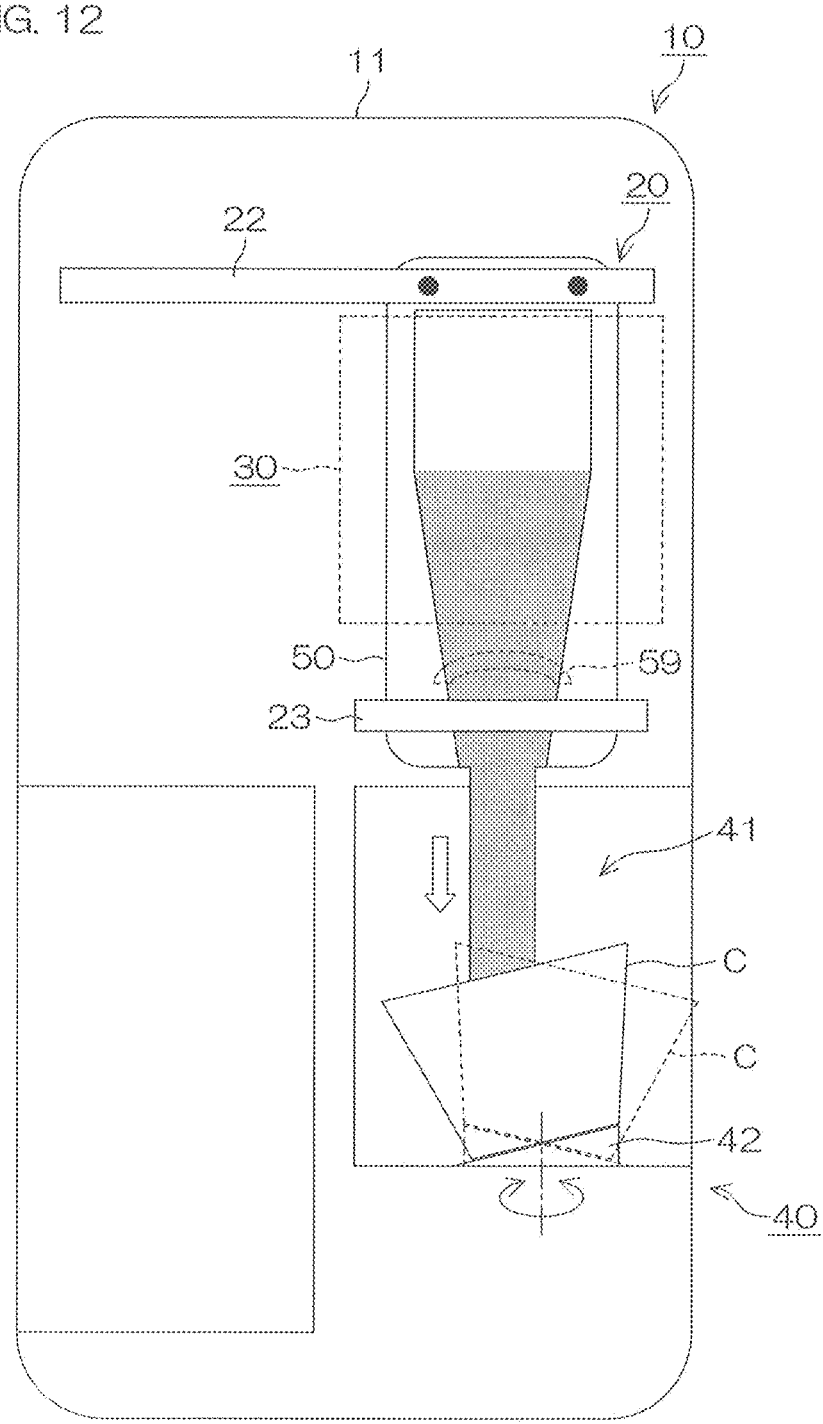
FIG. 12 is a schematic side view for describing the structure and the operation of the gelato server 10, focusing on the serving mechanism.

Referring to FIGS. 11 to 14, the gelato server 10 includes a cup placement chamber 41 disposed in a front lower portion of the housing 11. A cup C can be loaded into and unloaded from the cup placement chamber through a front portion of the housing 11. A placement table 42 on which the cup C is placed is provided on a bottom of the cup placement chamber 41. On the placement table 42, the cup C is placed in a tilted state. Further, a rotating device 43 for rotating the placement table 42 is incorporated in the housing 11. As shown in FIG. 12, when the ice cream is served in the cup C, the rotating device 43 rotates the placement table 42 to rotate the cup C placed on the placement table 42, whereby the ice cream is neatly spirally poured in the cup C.

As shown in FIG. 11, the frozen ice cream contained in the packaging container 50 is set in the setting mechanism 20, and the cup C is placed in the cup placement chamber 41. Then, the temperature of the ice cream contained in the packaging container 50 set in the setting mechanism 20 is adjusted by the heat exchanging/pressing mechanism 30, and the temperature-adjusted ice cream is extruded from the packaging container 50. At this time, the weakly sealed portion 59 of the packaging container 50 is opened. Then, the extruded ice cream flows down. The ice cream thus flowing down is received in the cup C being rotated or vertically moved. Thus, the ice cream is served in the cup C (see FIG. 12).

Figure 13:
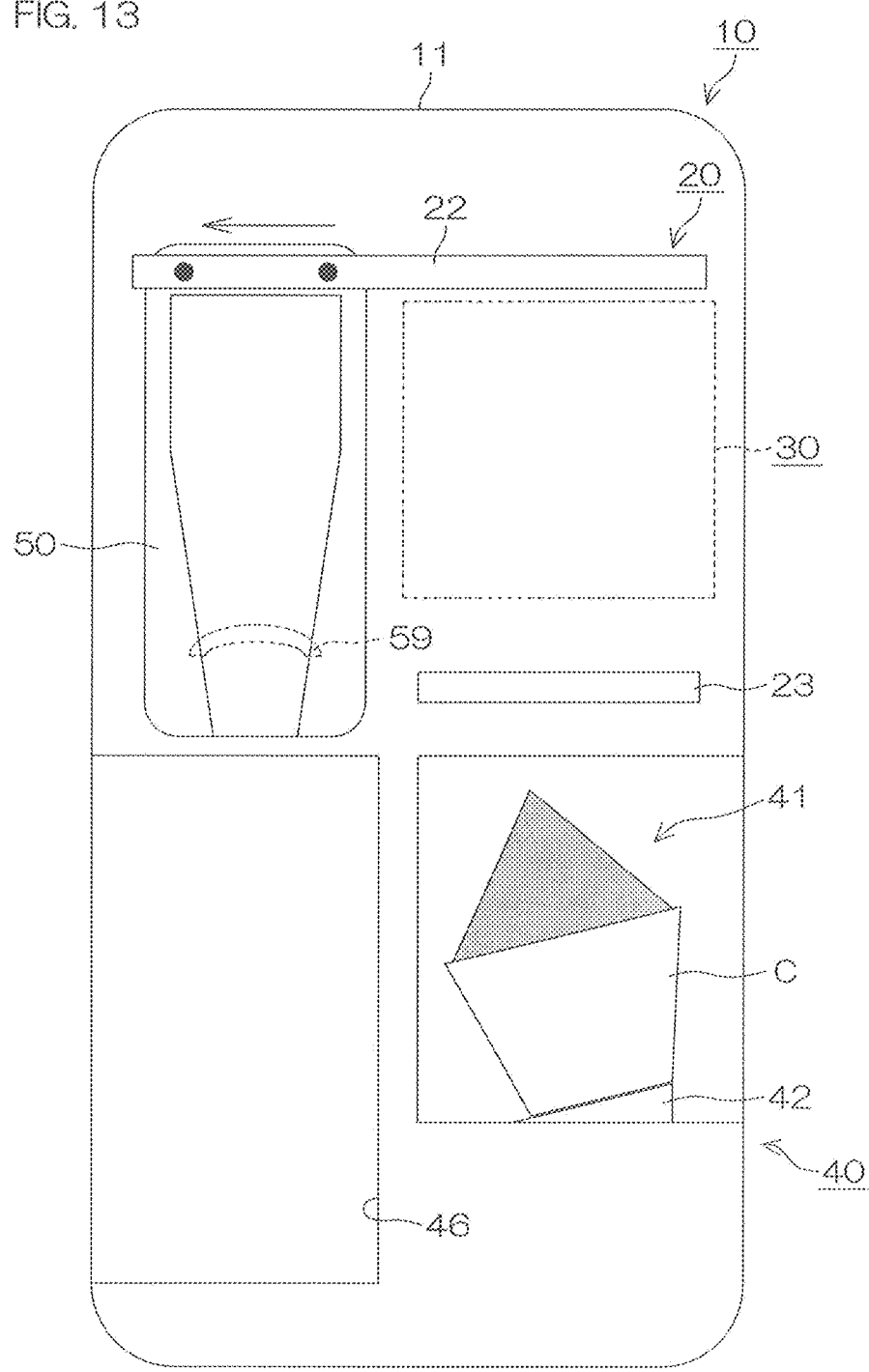
FIG. 13 is a schematic side view for describing the structure and the operation of the gelato server 10, focusing on the serving mechanism.
Figure 14:
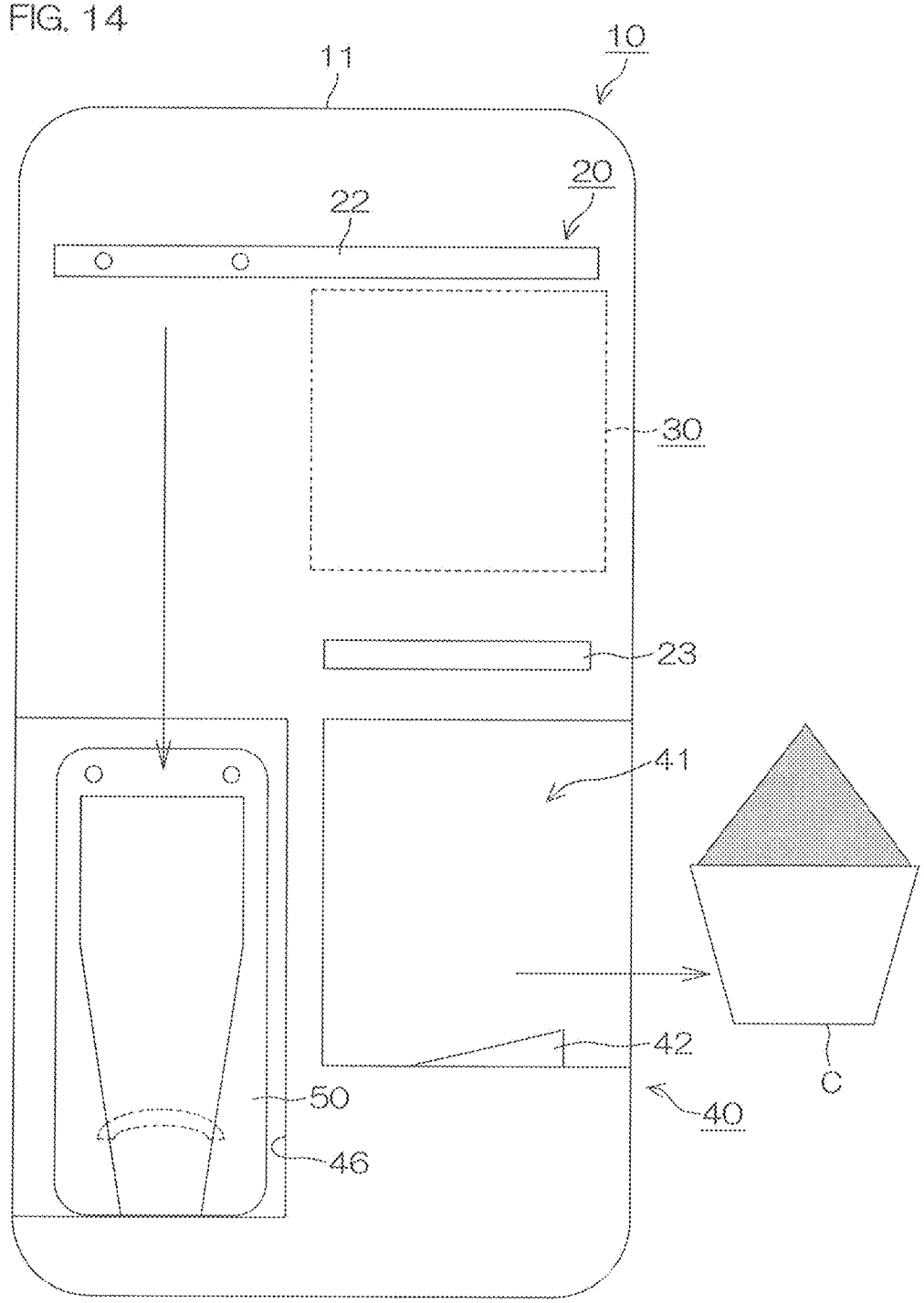
FIG. 14 is a schematic side view for describing the structure and the operation of the gelato server 10, focusing on the serving mechanism.

Referring to FIG. 13, the empty packaging container 50 is moved rearward in the housing 11 by the action of the upper portion supporting device 22 of the setting mechanism 20. When the empty packaging container 50 is released from the upper portion supporting device 22, the empty packaging container 50 falls down to be recovered in a trash chamber 46 (see FIG. 14).

Figure 15:
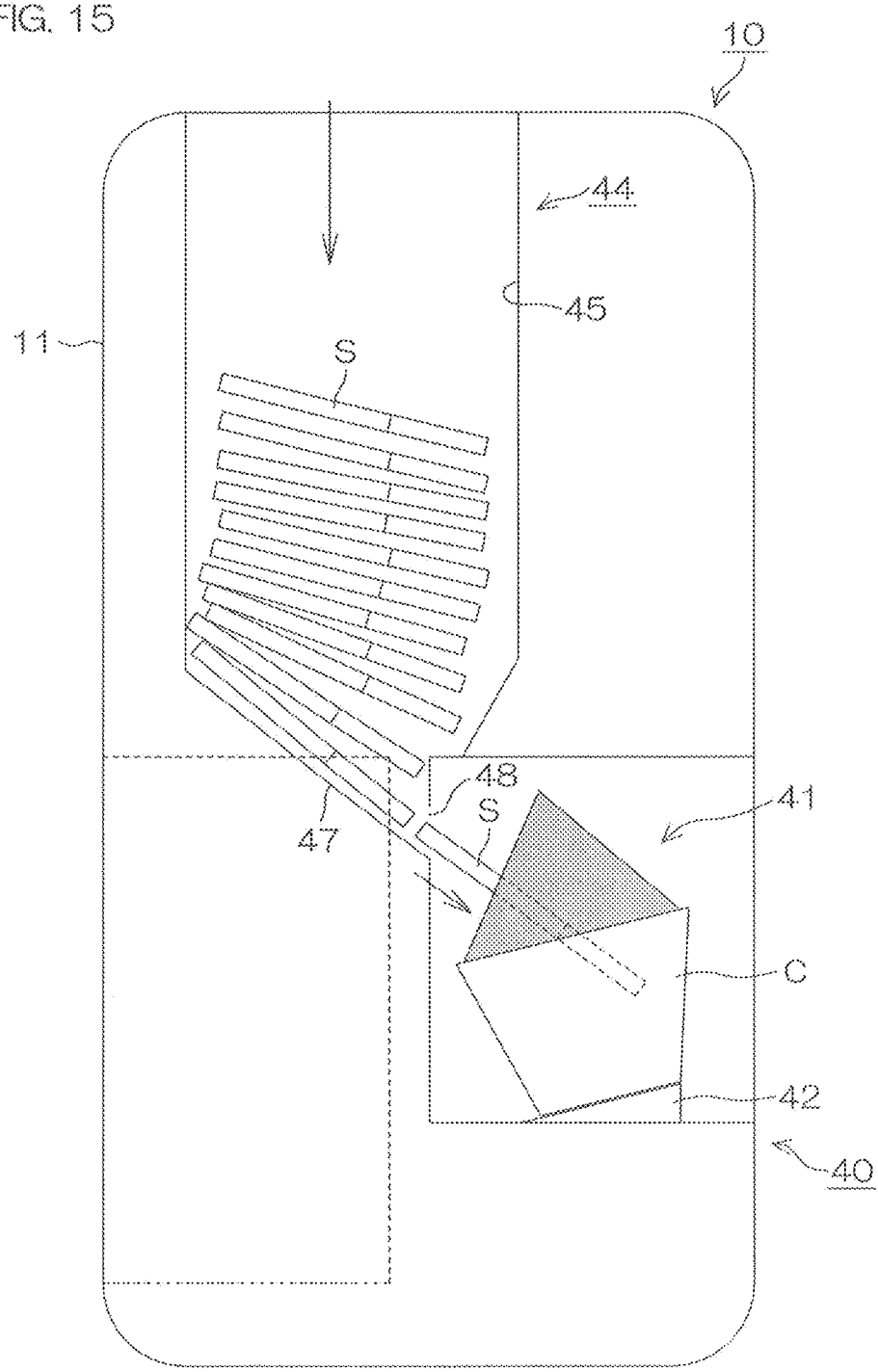
FIG. 15 is a schematic side view for describing the structure and the operation of the gelato server 10, focusing on the serving mechanism.

FIG. 15 is a schematic side view for describing the structure and the operation of a gelato server 10 according to another embodiment of the present invention, focusing on a serving mechanism 40. FIG. 16 is a front view of the gelato server 10 shown in FIG. 15.

A feature of the gelato server 10 shown in FIGS. 15 and 16 is that the serving mechanism 40 additionally includes a spoon feeding device 44. The spoon feeding device 44 is adapted to automatically insert a spoon to the ice cream served in the cup C. The spoon feeding device 44 has a vertically-elongated smaller-width carton 45 in which spoons S (which may be plastic spoons, or spoons made of a single material such as wood or paper or a composite material of paper and a resin) are vertically stacked. The carton 45 has a bottom 47 significantly tilted and communicating with an upper portion of the cup placement chamber 41 through a connection port 48. The connection port 48 is provided with a shutter not shown. Whenever the shutter is opened, a single spoon S is fed into the cup placement chamber 41 by gravity to stick into the ice cream.

The opening of the shutter may be mechanically associated with the feeding of the spoon S, so that the spoon S can be fed mechanically, for example, by the force of a spring or the like, rather than by gravity.

FIG. 17 are diagrams showing an exemplary spoon S to be used in the spoon feeding device 44. FIGS. 17(A), 17(B) and 17(C) are a side view, a plan view and a front view, respectively, of the spoon. The spoon S is a flat plastic plate including a scoop portion (action portion) having a greater width than a handle thereof. FIG. 17(D) is a plan view of a spoon S provided with a bingo mark. Some of multiple spoons S stacked and stored in the carton 45 may be selectively provided with a mark "☆" as shown in FIG. 17(D).

At a store, a user who eats ice cream dispensed from the gelato server 10 can detect "Bingo!" by way of the spoon S. For example, the user may photograph the Bingo spoon by using a smartphone application to take in the image of the spoon, and add up a count on the web.

Figure 18:
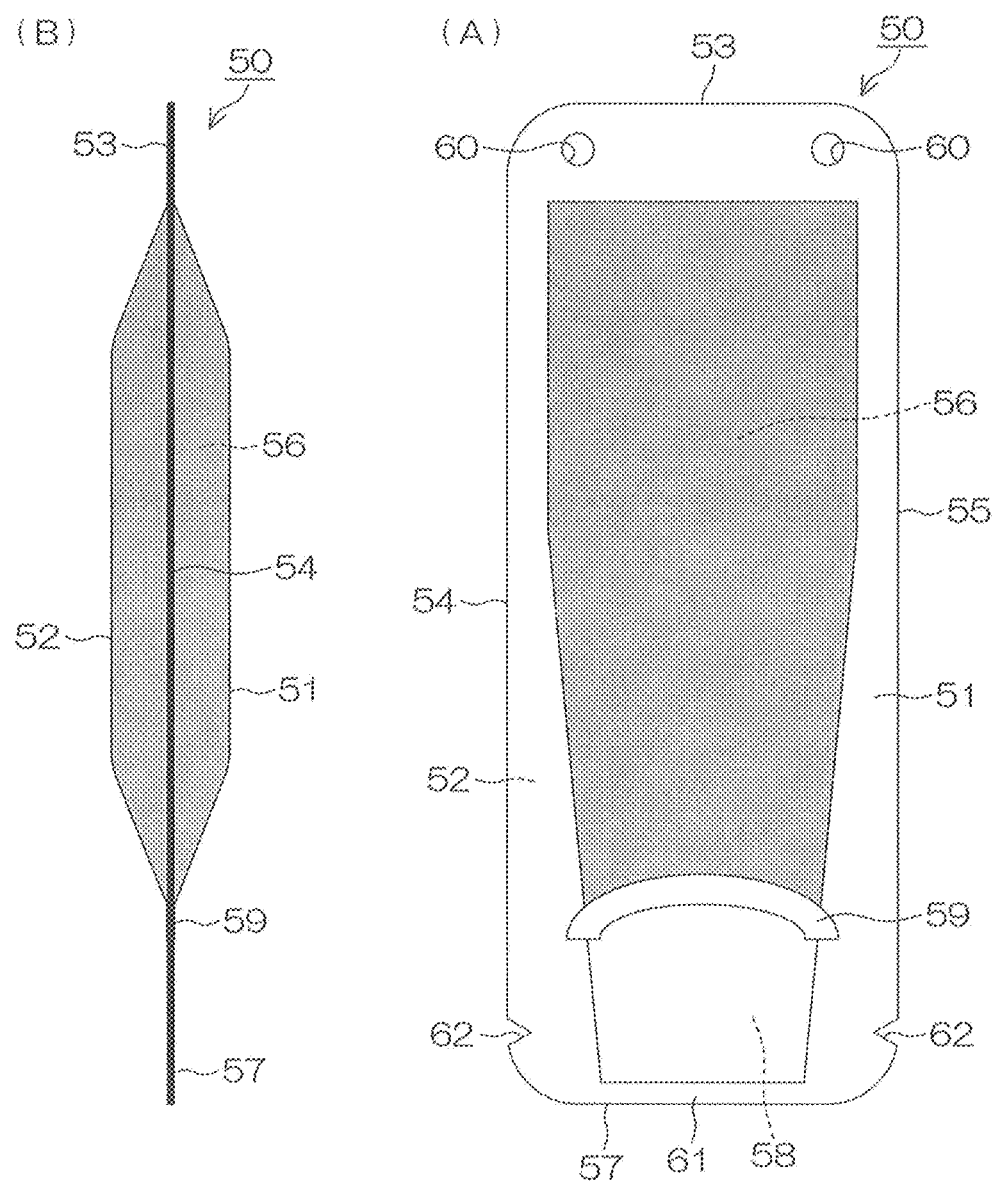
FIG. 18 are a schematic front view (FIG. 18(A)) and a schematic side view (FIG. 18(B)), respectively, of a packaging container according to another embodiment of the present invention.

FIG. 18 are a schematic front view (FIG. 18(A)) and a schematic side view (FIG. 18(B)) of a packaging container 50 according to another embodiment of the present invention. As shown in FIG. 18, a lower portion 57 of the packaging container 50 has a strongly sealed portion 61 formed by heat-sealing a lower edge of an outlet port 58. In this case, cutting guides 62 each having a small triangular shape may be provided in lower left and right side portions of films 51, 52, so that the strongly sealed portion 61 can be torn off.

Figure 19:
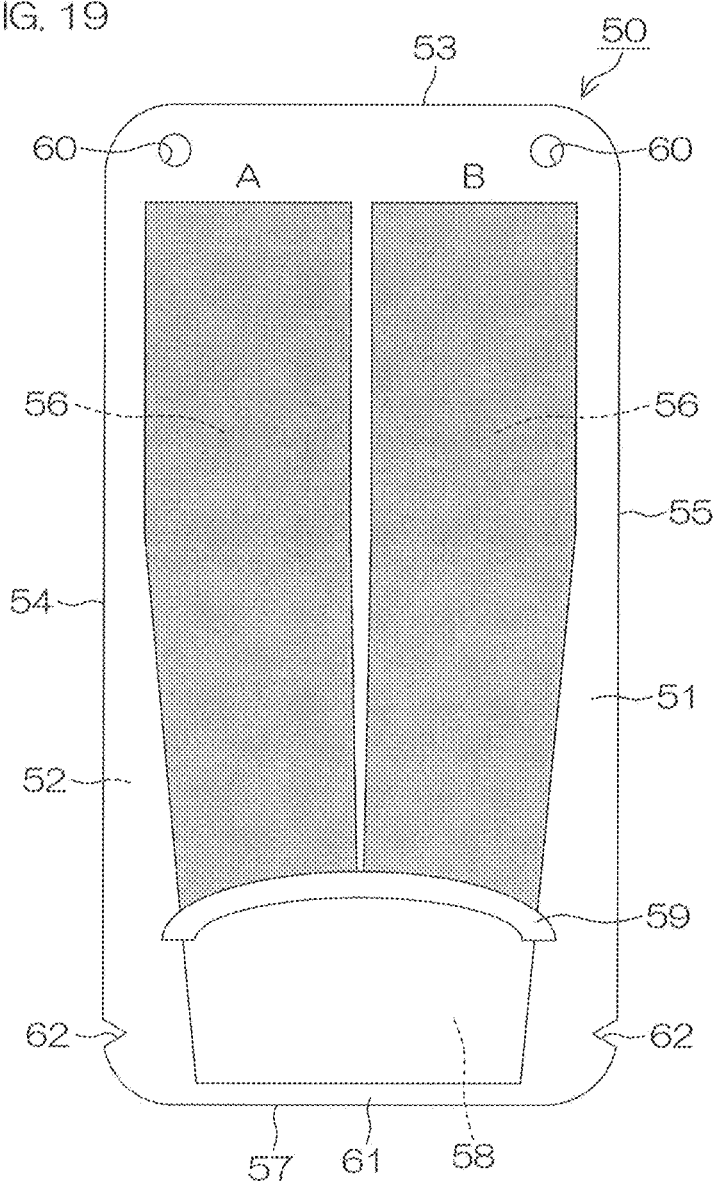
FIG. 19 is a schematic front view of the packaging container according to further another embodiment of the present invention.

FIG. 19 is schematic front view of a packaging container 50 according to further another embodiment of the present invention. As shown in FIG. 19, the bag-like storage chamber 56 may include two chambers provided on left and right sides and having a common outlet port 58. The two chambers of the bag-like storage chamber 56 may include, for example, a chamber A containing vanilla ice cream and a chamber B containing different taste ice cream or different food (sauce or the like). Thus, the two ice creams having different colors can be extruded to be served after the temperature adjustment thereof.

Figure 20:
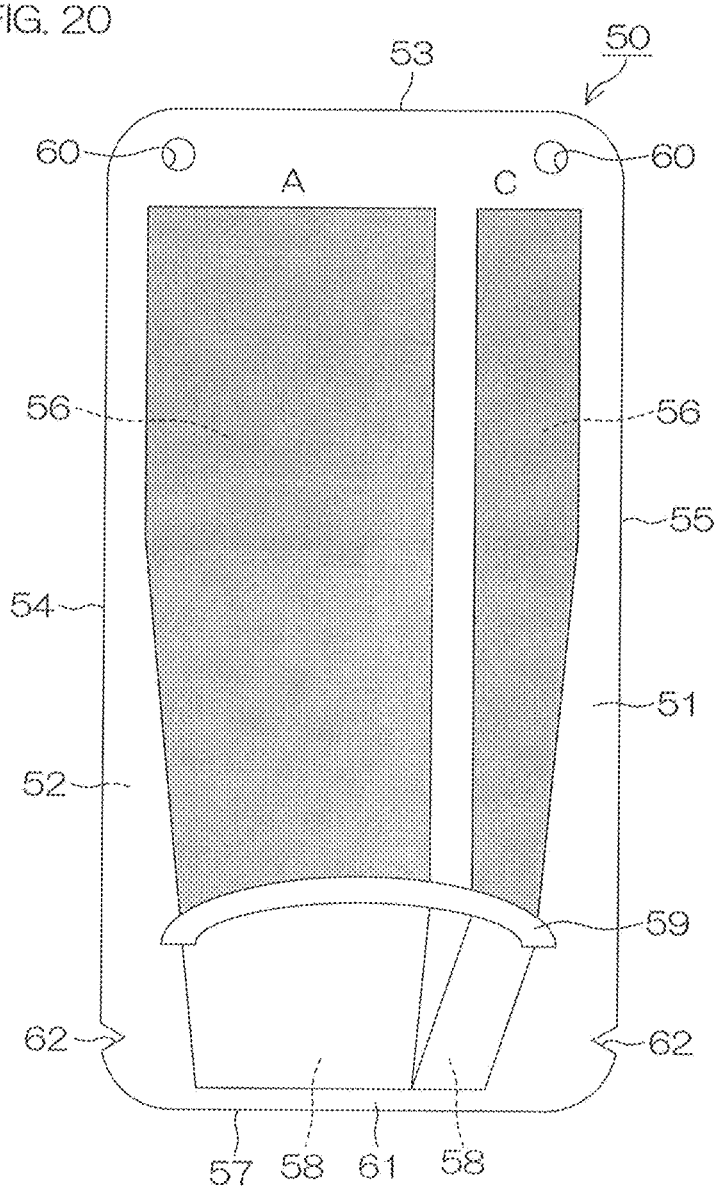
FIG. 20 is a schematic front view of a packaging container according to still another embodiment of the present invention.

FIG. 20 is a schematic front view of a packaging container 50 according to still another embodiment of the present invention. In the packaging container 50 of FIG. 20, the bag-like storage chamber 56 includes two chambers including a chamber A containing ice cream and a chamber C containing dry food (cookies, nuts, cereals or the like) having a lower water content.

The packaging container 50 having such a structure makes it possible to impart ice cream with crispy taste after the ice cream is temperature-adjusted and extruded.

Figure 21:
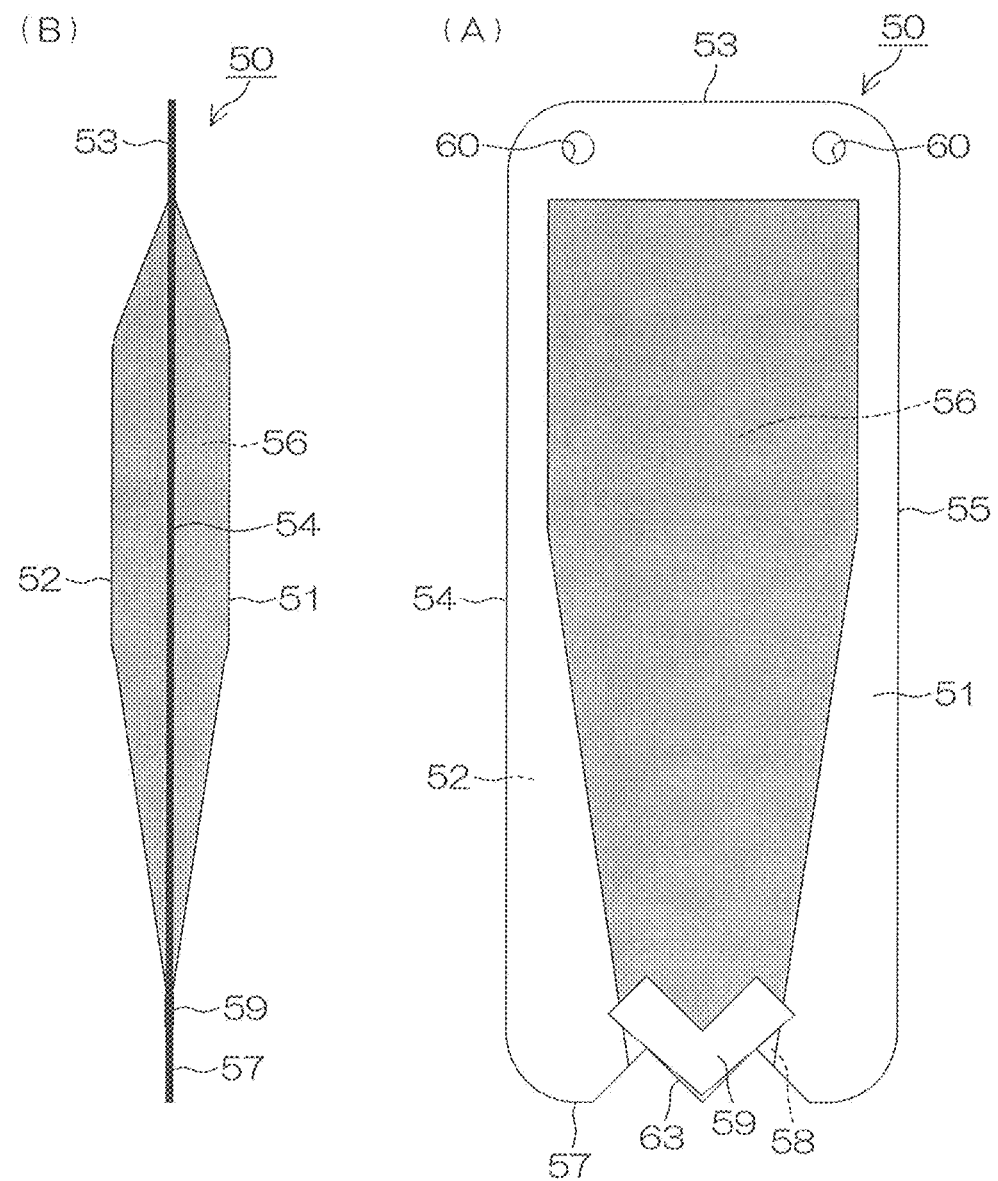
FIG. 21 are a front view (FIG. 21(A)) and aside view (FIG. 21(B)), respectively, of a packaging container according to further another embodiment of the present invention.

FIG. 21 are a schematic front view (FIG. 21(A)) and a schematic side view (FIG. 21(B)), respectively, of a packaging container 50 according to further another embodiment of the present invention.

As shown in FIG. 21, the packaging container 50 may have an outlet port 58 having a sharp outlet edge, e.g., a chevron-shaped cutting portion 63. Thus, the extruded ice cream can be imparted with streaky decoration by the chevron-shaped cutting portion 63.

Figure 22:
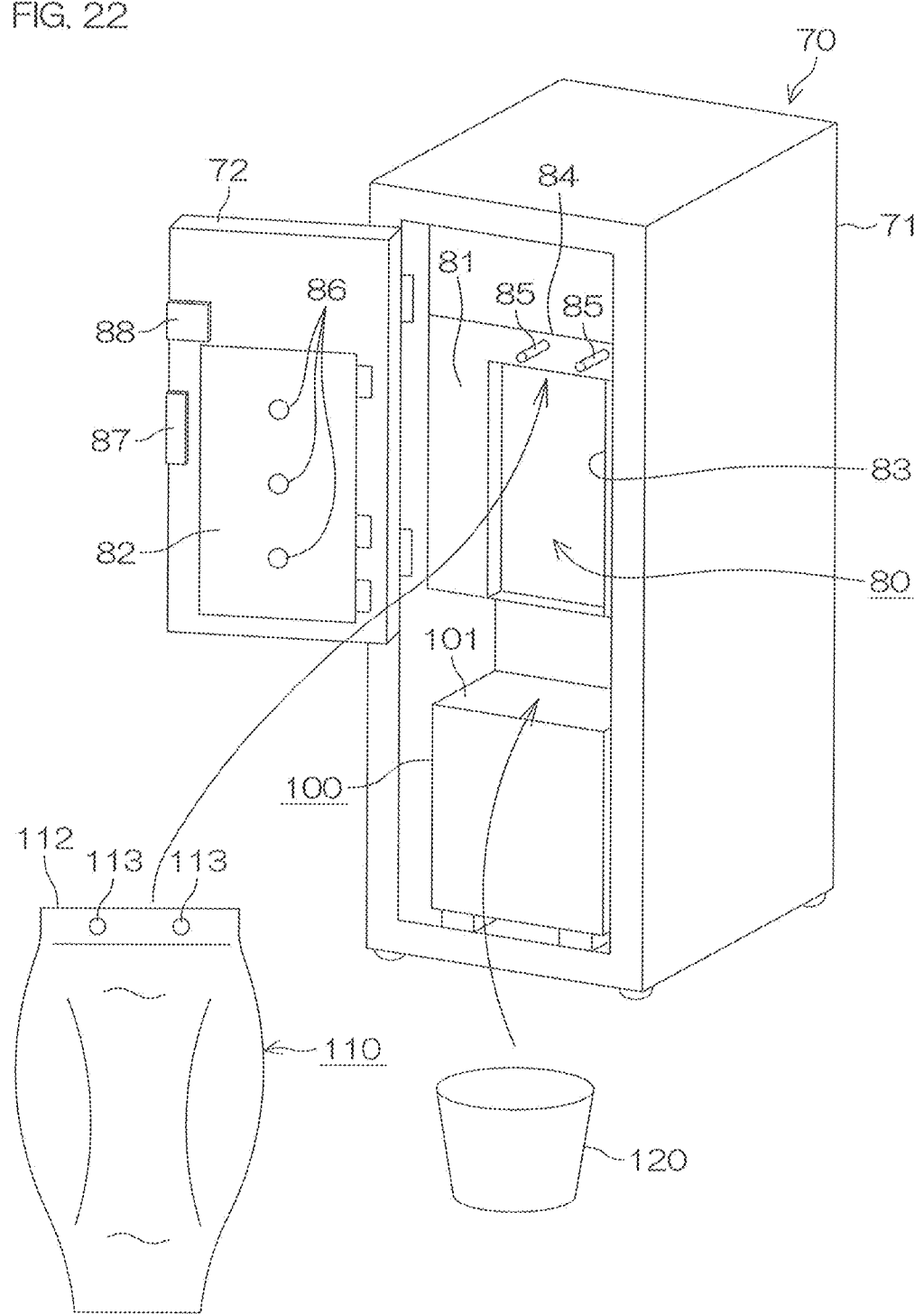
FIG. 22 is a perspective view showing the appearance of a gelato server 70 according to still another embodiment of the present invention, also showing packed ice cream 110 and a cup 120 to be set in the gelato server 70.

FIG. 22 is a perspective view showing the appearance of a gelato server 70 according to still another embodiment of the present invention, also showing packed ice cream 110 and a cup 120 to be set in the gelato server 70.

The gelato server 70 includes a setting mechanism 80 incorporated in a housing 71, a temperature adjusting device 90 (see FIG. 23, not shown in FIG. 22) provided behind the setting mechanism 80, and a receiving portion 100.

When a door 72 provided on a front upper portion of the housing 71 is opened, the setting mechanism 80 appears. The setting mechanism 80 is a mechanism in which frozen food (temperature adjustment object) to be temperature-adjusted, i.e., packed ice cream 110 freeze-stored in a solid state at not higher than about −20° C., is placed.

The setting mechanism 80 includes a support frame 81 disposed in a front inner portion thereof with the door 72 open for supporting one of opposite side surfaces (e.g., a rear surface) of the packed ice cream 110, and a pressing plate 82 disposed on an inner surface of the door 72 and opposed to and spaced a predetermined distance from the support frame 81 to be brought into abutment against the other side surface (e.g., a front surface) of the packed ice cream 110 opposite from the one side surface with the door 72 closed.

An opening/closing detection switch 87 which detects whether the door 72 is opened or closed and a door lock solenoid 88 for locking the door 72 in a closed state are provided on the door 72.

The support frame 81 has a window 83 through which a major portion of the one side surface (a major portion of the rear surface) of the packed ice cream 110 is exposed rearward. Further, two retractable pins 85, for example, are provided in juxtaposition as the engagement member on an upper frame portion 84 of the window 83. The two pins 85 are capable of respectively engaging with two holes 113 provided along an upper edge 112 of a packaging bag (package) for the packed ice cream 110.

Any of the packaging containers described above may be used as the packaging bag (package) for the packed ice cream 110.

The pins 85 are adapted to engage with the packaging bag (package) so as to prevent the packaging bag from falling down. Therefore, the number of the pins 85 is not limited to two (this embodiment), but may be any number between 1 to about 4. Alternatively, clips or the like may be used as the engagement member.

The pressing plate 82 is made of, for example, a resin plate, and has an undulated or uniquely curved surface which can easily abut against the surface of the packed ice cream 110. Alternatively, the pressing plate 82 may be made of a highly heat-conductive metal plate such as an aluminum plate. The pressing plate 82 may be provided on the inner surface of the door 72 with the intervention of, for example, a resilient member such as a spring so as to be resiliently displaceable forward and rearward. Three temperature sensors 86, for example, may be disposed in vertically aligned relation on a transversely middle portion of the surface of the pressing plate 82. The temperature sensors 86 are each adapted to measure the temperature of the packed ice cream 110 against which the pressing plate 82 abuts. Further, the pressing plate 82 may be provided with a pressure sensor which detects whether or not the pressing plate 82 is pressed against the packed ice cream 110, i.e., whether or not the packed ice cream 110 is placed, and detects a pressure applied to the rear surface of the packed ice cream 110 by a kneading roller.

In this embodiment, a lower portion of the packaging bag (package) is held between a lower portion of the support frame 81 and a lower portion of the pressing plate 82. Therefore, the lower portion holding/guiding device 23 provided in the previous embodiment is omitted, but a similar device may be additionally provided.

The temperature adjusting device 90 to be described later is provided behind the window 83 in the housing 71.

The receiving portion 100 is disposed in a front lower portion of the housing 71. The receiving portion 100 includes a base 101, on which a predetermined container (e.g., a cup) 120 is placed. Ice cream (gelato) temperature-adjusted and extruded from the packaging bag (package) to flow down is received in the cup 120 placed on the base 101. After the ice cream is served in the cup 120, the receiving portion 100 can be slid forward. Therefore, the cup 120 served with the ice cream can be easily taken out from the base 101.

Figure 23:
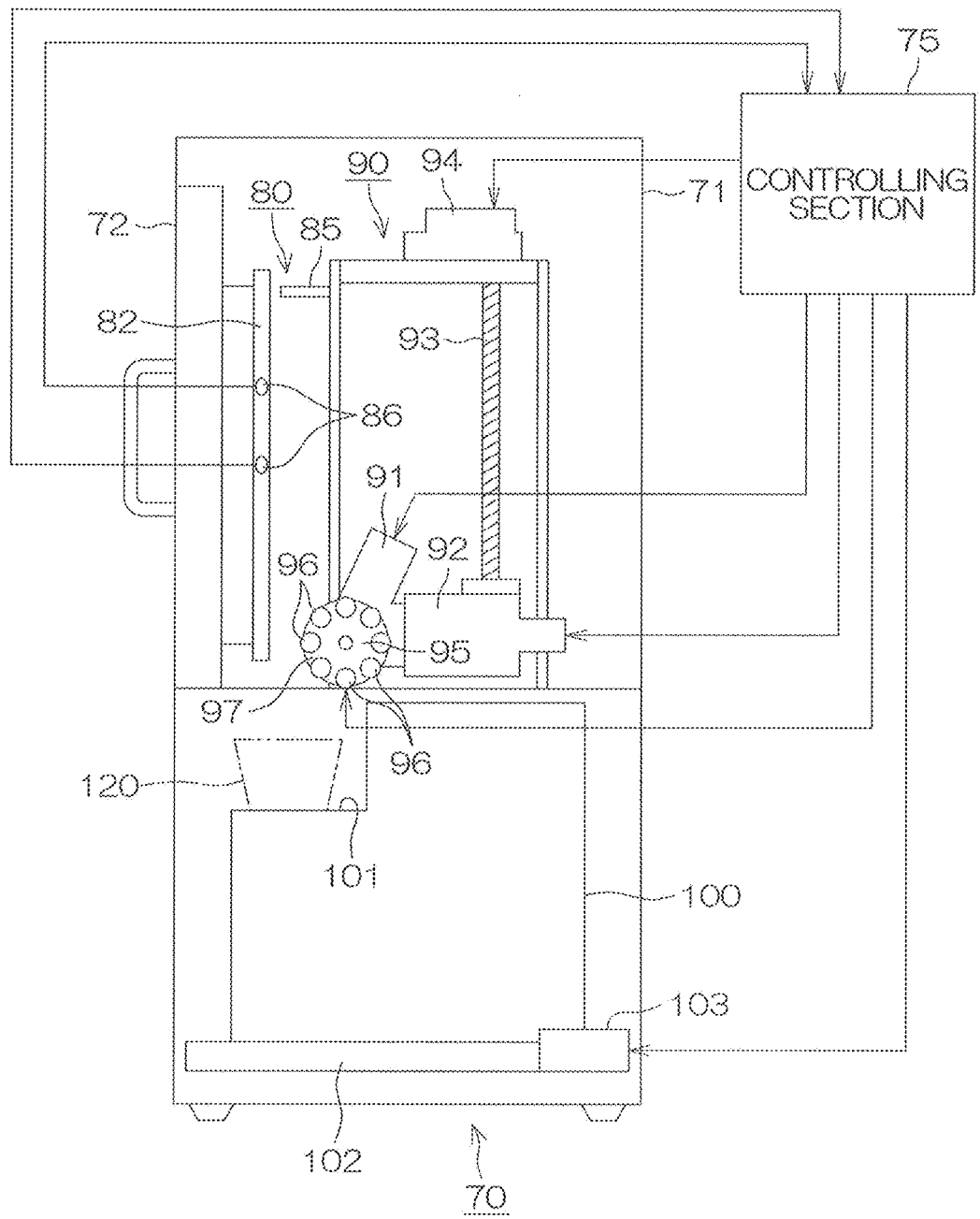
FIG. 23 is a right side vertical sectional view of the gelato server 70.

FIG. 23 is a right side vertical sectional view of the gelato server 70. In FIG. 23, a reference numeral 80 denotes the setting mechanism, and the temperature adjusting device 90 is provided behind the setting mechanism (on the right side in FIG. 23).

Figure 24:
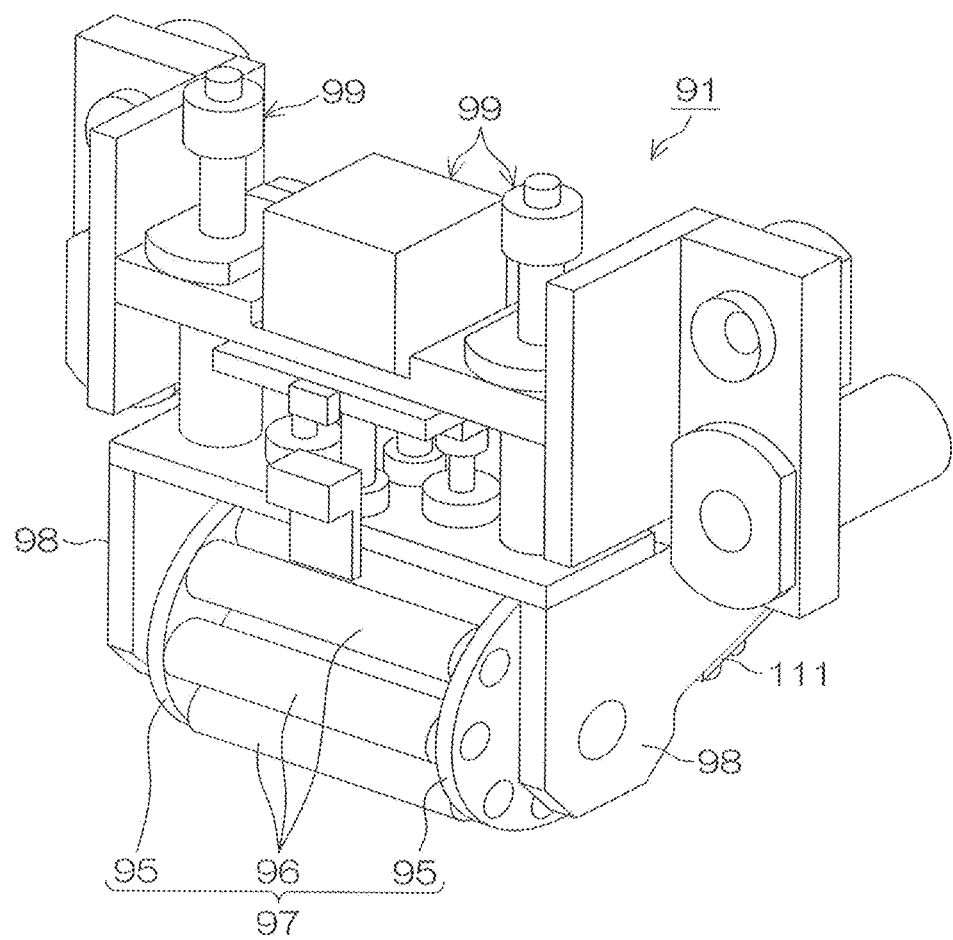
FIG. 24 is a perspective view showing the structure of a roller unit 91.

The temperature adjusting device 90 includes a roller unit 91 shown in FIG. 24. The roller unit 91 is movable up and down and movable forward and rearward. More specifically, the temperature adjusting device 90 includes the roller unit 91, a mount block 92 connected to a rear portion of the roller unit 91, and a ball screw 93 and a drive motor unit 94 for moving up and down the mount block 92.

As shown in FIG. 24, the roller unit 91 includes a kneading roller 97 including a pair of disks 95 disposed on left and right sides, and a plurality of metal rollers 96 disposed circumferentially of the disks 95 and respectively having horizontally extending rotation axes. The kneading roller 97 is held by a frame 98, and is rotatable about a horizontal center axis extending between the centers of the pair of disks 95.

The frame 98 is provided with a forward/rearward driving device 99 (e.g., a forward/rearward moving device including a step motor and a spring) for moving the roller unit 91 from the mount block 92 forward and moving back the roller unit 91 rearward. The forward/rearward driving device 99 may include a pressure sensor which detects a pressing force applied to the packed ice cream 110 by the roller unit 91. Further, the frame 98 is provided with a lock solenoid 111 which locks the rotation of the kneading roller 97, i.e., the rotation of the pair of disks 95 about the horizontal center axis extending between the pair of disks 95. The lock solenoid 111 prevents the rotation of the kneading roller 97 (the pair of disks 95), for example, when a specific one of the metal rollers 96 of the kneading roller 97 is located at the forwardmost position (e.g., the disks 95 are located at a forward rotation angular position of 0 degree). Even in this state, the metal rollers 96 are each rotatably supported by the pair of disks 95.

Referring again to FIG. 23, the packed ice cream 110 is held between the support frame 81 of the setting mechanism 80 and the pressing plate 82, and the kneading roller 97 is pressed against the packed ice cream 110 through the window 83 of the support frame 81 (the kneading roller 97 is pressed forward to be brought into press contact with the packed ice cream 110).

Then, the mount block 92 is moved up and down, whereby the roller unit 91 is moved up and down. By moving up and down the roller unit 91, the plural metal rollers 96 supported by the pair of disks 95 are brought into rotating press contact with the rear surface of the packed ice cream 110, while respectively rotating.

Further, the pair of disks 95 are rotated by the up and down movement of the roller unit 91. Therefore, the plural metal rollers 96 supported by the disks 95 are sequentially moved in rotating press contact with the rear surface of the packed ice cream 110. Thus, the packed ice cream 110 is temperature-adjusted to a desired temperature level by heat exchange with the kneading roller 97. The front surface of the packed ice cream 110 abuts against the pressing plate 82 to be thereby pressed by the pressing plate 82.

The pressure applied to the packed ice cream 110 and pressure fluctuation are detected by the pressure sensor provided on the roller unit 91 and/or the pressure sensor provided on the pressing plate 82. Further, the temperature of the packed ice cream 110 and temperature fluctuation are detected by the temperature sensors 86 provided on the pressing plate 82.

After completion of the temperature adjustment of the packed ice cream 110, the roller unit 91 is moved to the uppermost position and shifted to the forwardmost position. In this state, the rotation of the kneading roller 97 (the pair of disks 95) is locked by the lock solenoid 111.

Then, the roller unit 91 is slowly moved down, and one of the metal rollers 96 located at the forwardmost position of the pair of disks 95 not rotated is pressed forward against the packed ice cream 110 and, in this state, is slowly moved down. Thus, the packed ice cream 110 is squeezed downward from the upper side. That is, the package containing the temperature-adjusted ice cream is squeezed, whereby the ice cream contained in the package is extruded from the outlet provided at the lower end of the package to be received in the cup 120. The squeezing operation for the extrusion of the packed ice cream 110 may be performed a plurality of times so as to properly extrude the packed ice cream.

The operations described above are performed by controlling the driving of the drive motor unit 94, the roller unit 91, the forward/rearward driving device 99, the lock solenoid 111 and the like by a controlling section 75 provided in the gelato server 70.

Figure 25:
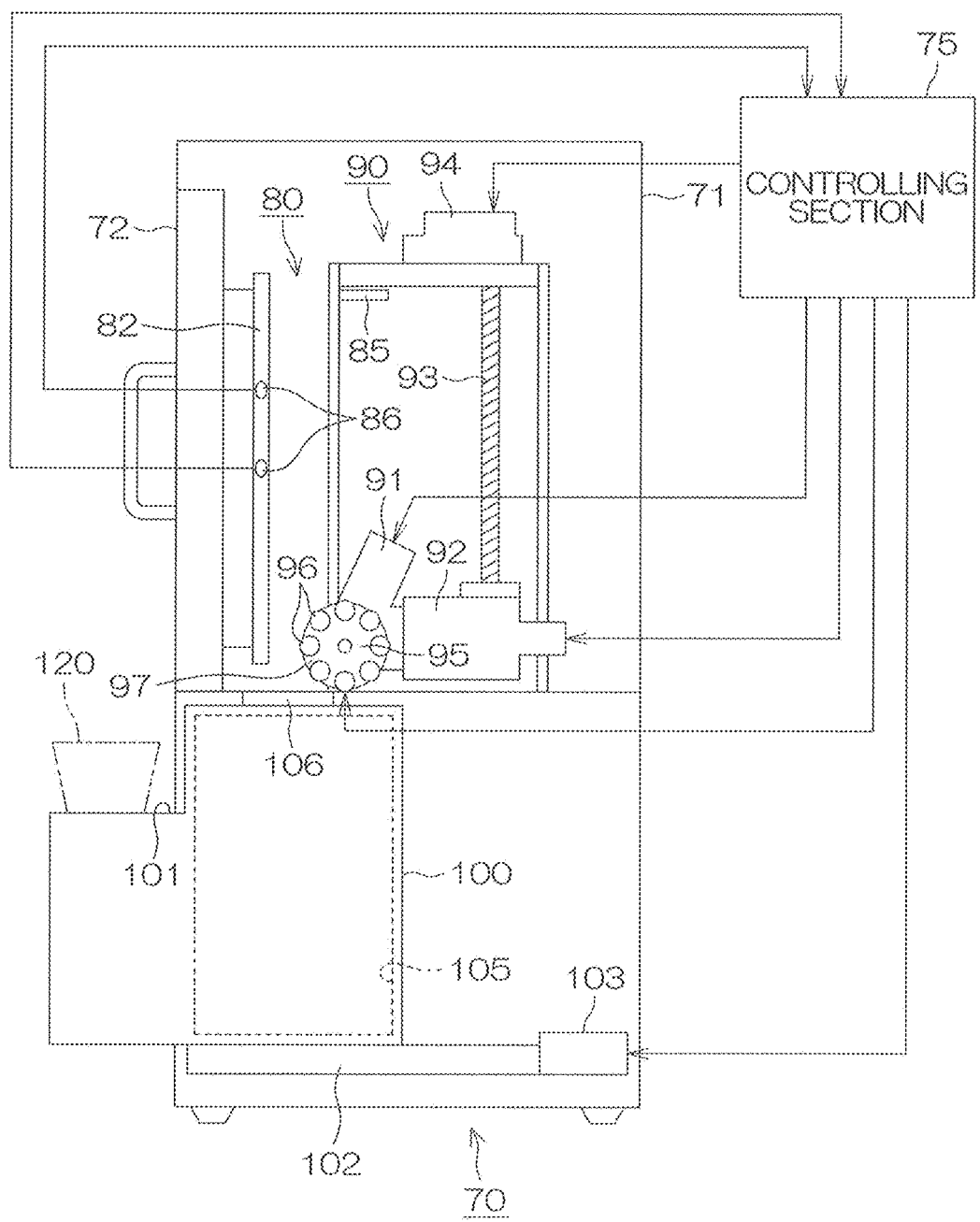
FIG. 25 is a schematic diagram showing a state observed when a receiving portion is slid forward of a housing 71 with the cup 120 placed thereon after the temperature adjustment of the packed ice cream 110 is completed and the ice cream (gelato) is extruded to be received by the cup 120.

FIG. 25 is a schematic diagram showing a state observed when the receiving portion 100 is slid forward of the housing 71 with the cup 120 placed thereon after the temperature adjustment of the packed ice cream 110 is completed and the extruded gelato (ice cream) is received in the cup 120.

As shown in FIG. 25, it is desirable to automatically move the receiving portion 100 forward from the housing 71 after the temperature adjustment is completed and the ice cream is served in the cup 120. Thus, the cup 120 served with the ice cream can be easily taken out.

A trash box 105 may be provided behind the receiving portion 100. The trash box 105 has an inlet 106 opening in an upper surface thereof. With the receiving portion 100 shifted forward, the inlet 106 is opposed to a space between the support frame 81 of the setting mechanism 80 and the pressing plate 82. When the pins 85 are retracted to the support frame 81, the package supported by the pins 85 falls down into the trash box 105 through the inlet 106 by gravity.

In FIG. 25, a reference numeral 102 denotes rails for sliding the receiving portion 100 forward and rearward, and a reference numeral 103 denotes a driving device for moving the receiving portion 100 forward and rearward.

FIG. 26 is a flow diagram showing an exemplary temperature adjustment process to be performed by the gelato server 70. With reference to FIGS. 22 to 25, an exemplary operation of the gelato server 70 will be described according to the process flow shown in FIG. 26.

When power is turned on, for example, the gelato server 70 is put into standby, and the door 72 is ready for opening (Step S1). Since the opening/closing detection switch 87 is provided in association with the door 72, the controlling section 75 detects the opening of the door 72 based on an output of the detection switch 87, and projects the pins 85 so as to permit the placement of the packed ice cream 110 (Step S2).

When the controlling section 75 detects the closing of the door 72 (Step S3) and detects the placement of the packed ice cream 110 (Step S4), the door 72 is locked (Step S5).

Thereafter, the controlling section 75 drives the roller unit 91, the drive motor unit 94 and the forward/rearward driving device 99 to perform a heat exchanging and pressing operation, i.e., the temperature adjustment process, to adjust the temperature of the packed ice cream 110 by rotating the kneading roller 97 and moving up and down the kneading roller 97 (Step S6), and shifting the kneading roller 97 forward (Step S7).

The temperature adjustment process is preferably stopped when the pressure sensor provided on the roller unit 91 or the pressure sensor provided on the pressing plate 82 detects a predetermined pressure level (Step S9), but may be additionally controlled to be stopped when the temperature of the packed ice cream 110 reaches a predetermined temperature level (Step S8). The thickness and the softness of the packed ice cream 110 are changed by repeatedly moving up and down the kneading roller 97. Therefore, a program for detecting an optimum state of the temperature-adjusted packed ice cream based on the thickness and the softness and further based on the temperature and the like is incorporated in the controlling section 75, and the temperature adjustment is completed when the packed ice cream is temperature-adjusted in the optimum state.

The completion of the temperature adjustment may be controlled through time management using a timer, rather than based on the outputs of the sensors, or by using both the timer and the sensors.

In this embodiment, as described above, the controlling section 75 drives the temperature adjusting device 90 to cause the kneading roller 97, the drive motor unit 94 and the forward/rearward driving device to perform the temperature adjustment process (temperature adjustment mode).

After the completion of the temperature adjustment, an extrusion mode is performed.

In this embodiment, it is checked if the cup 120 is set on the base 101 (Step S10), before the extrusion mode is performed. If the cup 120 is not set, a user is prompted to set the cup 120 by an alarm using a sound and/or an image (Step S11).

In the extrusion mode, the roller unit 91 is first moved up (Step S12), and is shifted to the forwardmost position (Step S13) with the rotation of the kneading roller 97 locked (Step S13). Thus, the specific one of the metal rollers 96 of the roller unit abuts against the uppermost portion of the rear surface of the packed ice cream 110, and the upper edge of the package of the packed ice cream 110 is pressed against the pressing plate 82.

From this state, the roller unit 91 is moved down to the lowermost position (Step S14). When the roller unit 91 is moved down, the package of the packed ice cream 110 is held between the pressing plate 82 and the metal roller 96 located at the forwardmost position of the rotation-locked roller unit 91 to be squeezed downward from the upper edge.

Although the extruding operation (squeezing operation) is performed once in this exemplary control flow, the squeezing operation may be controlled, for example, so that a lower half of the packed ice cream 110 is first squeezed and then the packed ice cream 110 is squeezed from the upper portion to the lower portion a plurality of times, e.g., three times.

Therefore, the closed outlet provided at the lower end of the package is opened by the internal pressure, and the temperature-adjusted packed ice cream, which is fluid, flows down from the package. When the roller unit 91 is moved to the lowermost position, all the ice cream flows out of the package to be served in the cup 120 placed on the base 101.

Thereafter, the base 101 is slid forward by the controlling section 75 (Step S15). Thus, the cup 120 served with the ice cream (gelato) can be easily taken out from the base 101.

As described above, when the base 101 is slid forward, the controlling section 75 retracts the pins 85 rearward (Step S16). With the pins 85 retracted, the upper portion of the package is released from the pins 85. Since the space defined between the pressing plate 82 and the support frame 81 in the setting mechanism 80 is sufficiently large for the empty package, the package falls down by gravity. Then, the empty package enters the trash box 105 through the inlet 106 behind the receiving portion 100.

The above operation is performed during a period in which the cup 120 is taken out from the base 101. Therefore, when the takeout of the cup 120 is detected (Step S17), the controlling section 75 slides back the base 101 rearward (Step S18), and unlocks the door 72 (Step S19). Thus, the gelato server 70 is returned to the initial state.

It should be understood that the present invention be not limited to the aforementioned embodiments, but various modifications may be made within the scope of the present invention defined by the appended claims.

REFERENCE SIGNS LIST

10 GELATO SERVER
11 HOUSING
20 SETTING MECHANISM
21 CONTAINER GUIDE PLATE
22 UPPER PORTION SUPPORTING DEVICE
23 LOWER PORTION HOLDING/GUIDING DEVICE
24 NOZZLE MECHANISM
25 GUIDE RODS
26 FIRST POLYARTICULAR MEMBER
27 SECOND POLYARTICULAR MEMBER
28 SMALL PIECE MEMBERS
29 CONNECTION PINS
30 HEAT EXCHANGING/PRESSING MECHANISM
31,32 SIDE FRAMES
33 PRESSING MEMBER
34 GUIDE GROOVES
35 SUPPORT BAR
36 CONTACT SURFACE
40 SERVING MECHANISM

41 CUP PLACEMENT CHAMBER
42 PLACEMENT TABLE
43 ROTATING DEVICE
44 SPOON FEEDING DEVICE
45 CARTON
46 TRASH CHAMBER
47 BOTTOM
48 INLET
50 PACKAGING CONTAINER
51,52 FILM SHEETS
53 UPPER PORTION
54 LEFT SIDE PORTIONS
55 RIGHT SIDE PORTION
56 BAG-LIKE STORAGE CHAMBER
57 LOWER PORTION
58 OUTLET PORT
59 WEAKLY SEALED PORTION
60 HOOK HOLES
61 STRONGLY SEALED PORTION
62 CUTTING GUIDES
63 CHEVRON-SHAPED CUTTING PORTION
70 GELATO SERVER
71 HOUSING
72 DOOR
75 CONTROLLING SECTION
80 SETTING MECHANISM
81 SUPPORT FRAME
82 PRESSING PLATE
83 WINDOW
84 UPPER FRAME PORTION
85 PINS
86 TEMPERATURE SENSORS
90 TEMPERATURE ADJUSTING DEVICE
91 ROLLER UNIT
92 MOUNT BLOCK
93 BALL SCREW
94 DRIVE MOTOR UNIT
95 DISKS
96 METAL ROLLERS
97 KNEADING ROLLER
98 FRAME
99 FORWARD/REARWARD DRIVING DEVICE
100 RECEIVING PORTION
101 BASE
102 RAILS
103 DRIVING DEVICE
105 TRASH BOX
106 INLET
110 PACKED ICE CREAM
111 LOCK SOLENOID
113 HOLES
120 CUP

What is claimed is:

1. A gelato server comprising:
a setting mechanism in which packed ice cream is placed;
a temperature adjusting device for adjusting a temperature of the packed ice cream placed in the setting mechanism to a desired temperature level; and
a receiving portion which receives the temperature-adjusted ice cream;
wherein the temperature adjusting device comprises:
a kneading roller including a plurality of metal rollers disposed parallel to each other in circumferentially equidistantly spaced relation, and a pair of disks which hold opposite ends of each of the plural metal rollers;
first driving means which moves up and down the kneading roller; and
second driving means which moves the kneading roller forward and rearward.

2. The gelato server according to claim 1, comprising locking means which locks rotation of the kneading roller with a specific one of the plural metal rollers rotated to a forwardmost position.

3. The gelato server according to claim 1, wherein the plural metal rollers per se are each rotatably supported by the pair of disks.

4. The gelato server according to claim 3, wherein the setting mechanism comprises:
a pressing plate to be brought into abutment against one of opposite side surfaces of the packed ice cream;
a support frame opposed to and spaced a predetermined distance from the pressing plate to support the other side surface of the packed ice cream opposite from the one side surface; and
an engagement member provided on an upper portion of the support frame for engagement with an upper portion of a package containing the ice cream.

5. The gelato server according to claim 4, wherein the kneading roller is brought into abutment against the other side surface of the packed ice cream to perform a kneading operation on the packed ice cream from the other side surface.

6. The gelato server according to claim 5, comprising an opening/closing door for opening and closing the setting mechanism,
wherein the pressing plate is provided on an inner side of the opening/closing door.

7. The gelato server according to claim 6, wherein the pressing plate includes a temperature sensor to be brought into abutment against the one side surface of the packed ice cream for measuring the temperature of the packed ice cream.

8. The gelato server according to claim 5, wherein the temperature adjusting device has:
a temperature adjusting mode in which the plural metal rollers of the kneading roller exchange heat with the packed ice cream and press the packed ice cream to perform a temperature adjustment process by rotating the kneading roller, moving the kneading roller up and down, and moving the kneading roller forward and rearward; and
an extruding mode in which the temperature-adjusted ice cream is extruded from the package by moving down the kneading roller with the rotation of the kneading roller locked by the locking means and with the kneading roller located at the forwardmost position.

9. The gelato server according to claim 8,
wherein the receiving portion includes a base on which a container is placed below the setting mechanism,
wherein the base is slidable forward and rearward,
wherein the base has an opening through which the package is received when the package falls from the setting mechanism with the base moved forward, and includes a box communicating with the opening.

* * * * *